(12) United States Patent
Bae et al.

(10) Patent No.: US 12,000,531 B2
(45) Date of Patent: Jun. 4, 2024

(54) DISPLAY APPARATUS

(71) Applicant: LG ELECTRONICS INC., Seoul (KR)

(72) Inventors: Joonsub Bae, Seoul (KR); Sangmoon Hwang, Seoul (KR); Jihyo Yoon, Seoul (KR); Yonghan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/756,187

(22) PCT Filed: Jan. 17, 2020

(86) PCT No.: PCT/KR2020/000854
§ 371 (c)(1),
(2) Date: May 18, 2022

(87) PCT Pub. No.: WO2021/145487
PCT Pub. Date: Jul. 22, 2021

(65) Prior Publication Data
US 2022/0403975 A1 Dec. 22, 2022

(51) Int. Cl.
*F16M 13/02* (2006.01)
*A47F 5/08* (2006.01)
(Continued)

(52) U.S. Cl.
CPC ............ *F16M 13/02* (2013.01); *F16M 11/10* (2013.01); *A47F 5/08* (2013.01); *F16M 11/04* (2013.01); *F16M 11/12* (2013.01); *F16M 11/38* (2013.01)

(58) Field of Classification Search
CPC ........ F16M 13/02; F16M 11/10; F16M 11/04; F16M 11/12; F16M 11/38; F16M 11/2014; F16M 11/2092
See application file for complete search history.

(56) References Cited

U.S. PATENT DOCUMENTS 8,693,172 B2 * 4/2014 Russell ............. F16M 11/2085
361/679.01
2006/0125360 A1 6/2006 Kim et al.
(Continued)

FOREIGN PATENT DOCUMENTS

CN 101454524 A * 6/2009 ............. F16M 11/04
CN 109630843 4/2019
(Continued)

OTHER PUBLICATIONS

PCT International Application No. PCT/KR2020/000854, International Search Report dated Oct. 13, 2020, 3 pages.
(Continued)

*Primary Examiner* — Tan Le
(74) *Attorney, Agent, or Firm* — LEE, HONG, DEGERMAN, KANG & WAIMEY

(57) ABSTRACT

A display device comprises: a display module including a display panel; at least one pair of first and second spacers positioned behind the display module and fixed to the display module; and a wall-mountable assembly which is positioned behind the back cover and fastened to the first and second spacers, and which allows the first and second spacers to move. The wall-mountable assembly includes: a fixing part fixed to a stationary object; a frame part having a pair of first and second tilting holes into which the first and second spacers are inserted, respectively, and which guide the movement paths of the first and second spacers; a link part connecting the fixing part and the frame part to each other; and an auxiliary locking part fixed to the fixing part and having at least one magnet attachable to at least a portion of the frame part by magnetic force.

19 Claims, 25 Drawing Sheets

(51) Int. Cl.
*F16M 11/04* (2006.01)
*F16M 11/10* (2006.01)
F16M 11/12 (2006.01)
F16M 11/38 (2006.01)

(56) References Cited

U.S. PATENT DOCUMENTS

| | | | |
|---|---|---|---|
| 2007/0252056 A1 | 11/2007 | Novin | |
| 2009/0101777 A1* | 4/2009 | Kim | F16M 13/02 |
| | | | 248/220.21 |
| 2009/0194655 A1* | 8/2009 | Huang | F16M 11/10 |
| | | | 248/282.1 |
| 2013/0168519 A1 | 7/2013 | In et al. | |

FOREIGN PATENT DOCUMENTS

| | | |
|---|---|---|
| KR | 1020020092698 | 12/2002 |
| KR | 1020080019483 | 3/2008 |
| KR | 100962008 | 6/2010 |
| KR | 1020180025776 | 3/2018 |

OTHER PUBLICATIONS

European Patent Office Application Serial No. 20913763.7, Search Report dated Sep. 19, 2023, 7 pages.

\* cited by examiner

[FIG. 1]
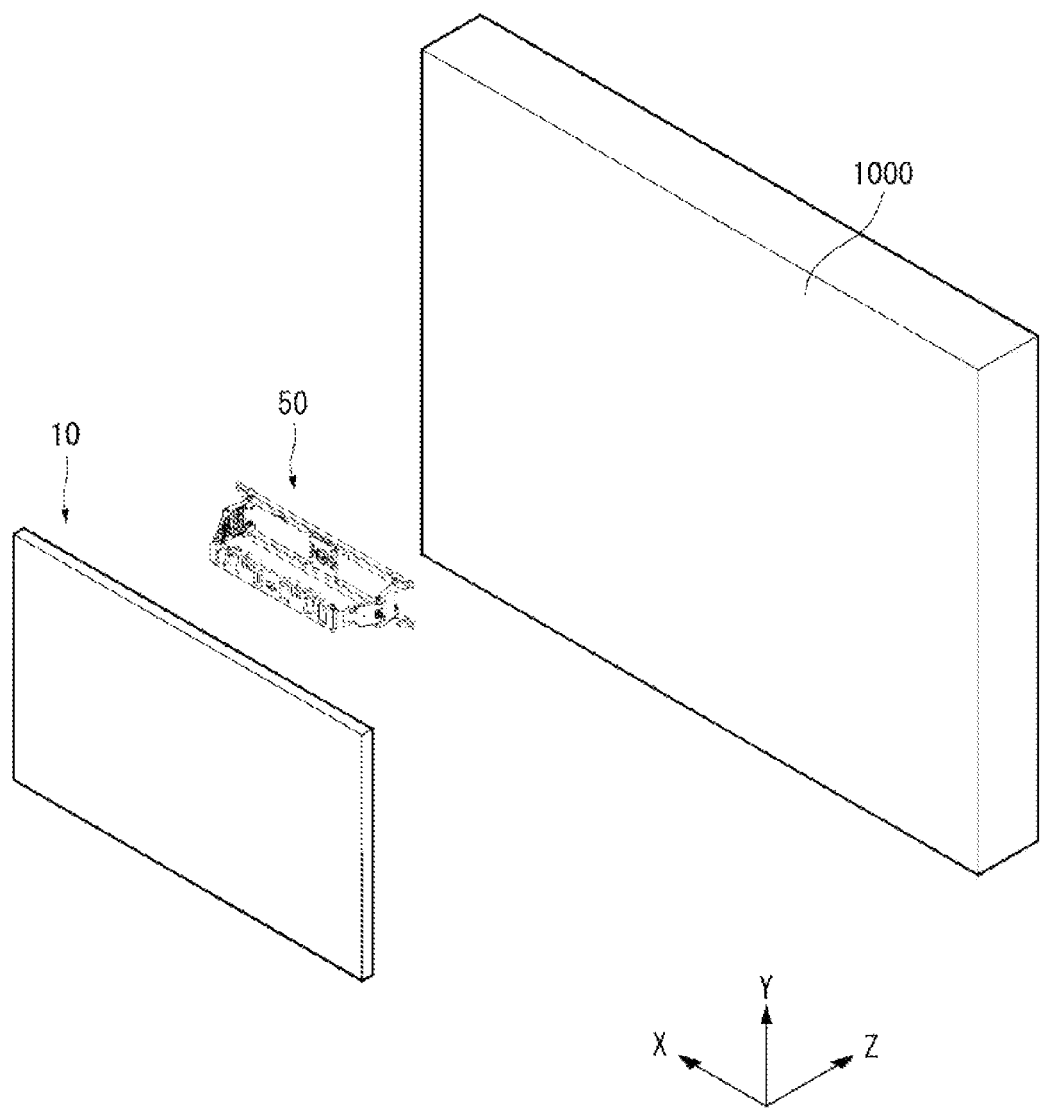

[FIG. 2]
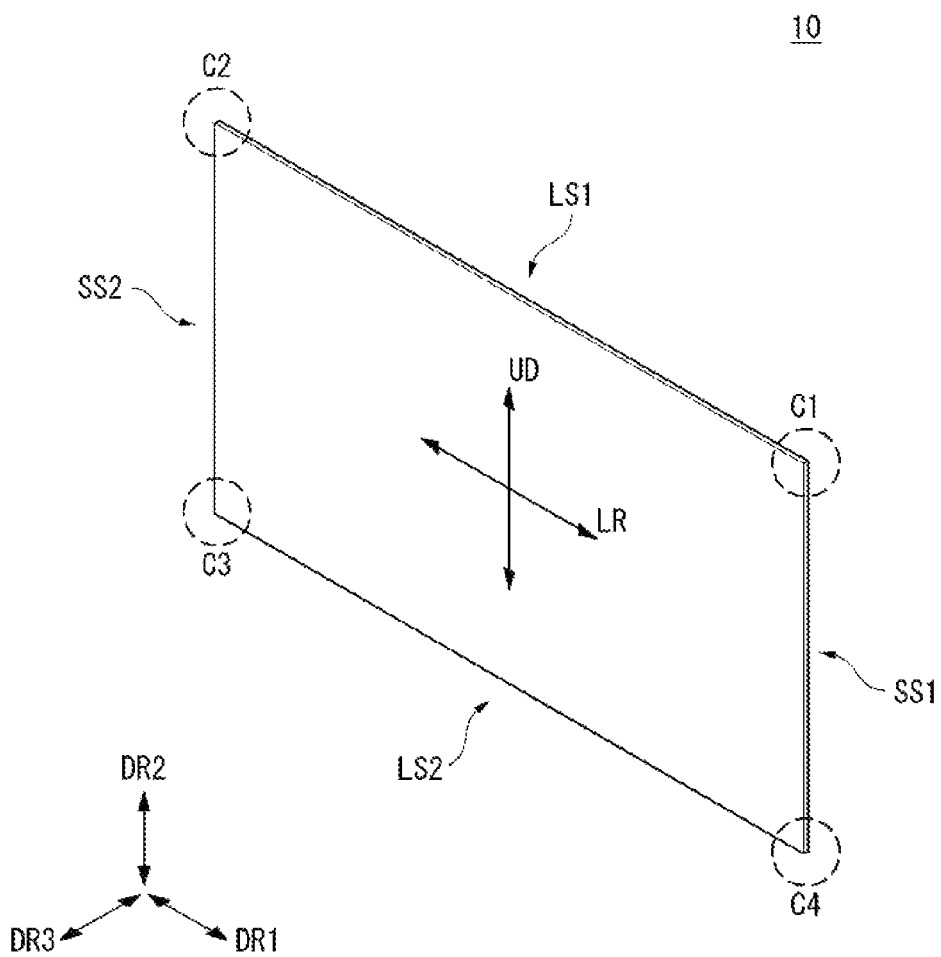
[FIG. 3a]
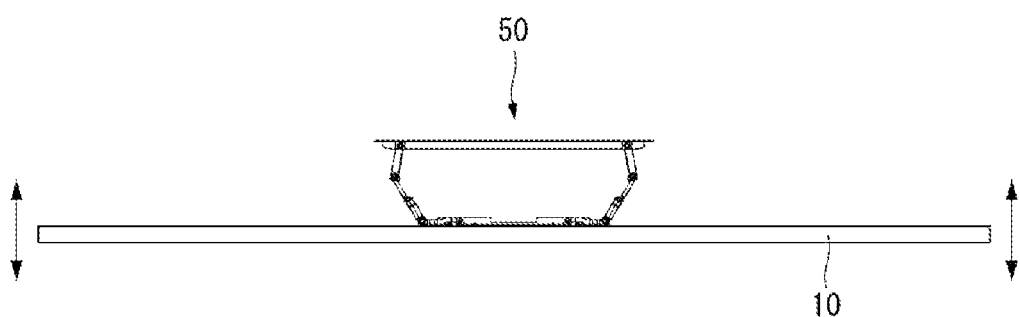

【FIG. 3b】
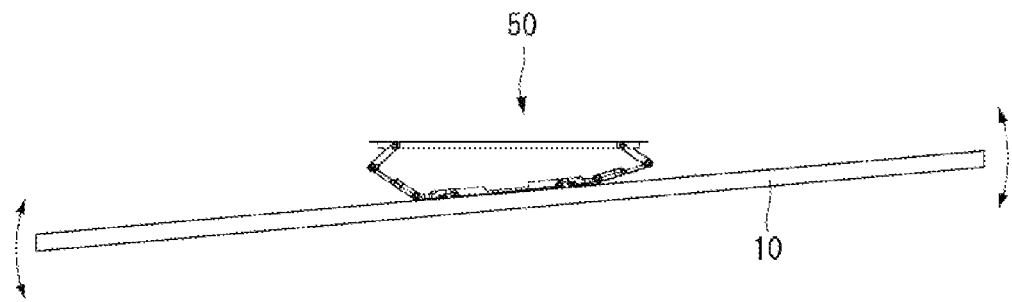
【FIG. 3c】
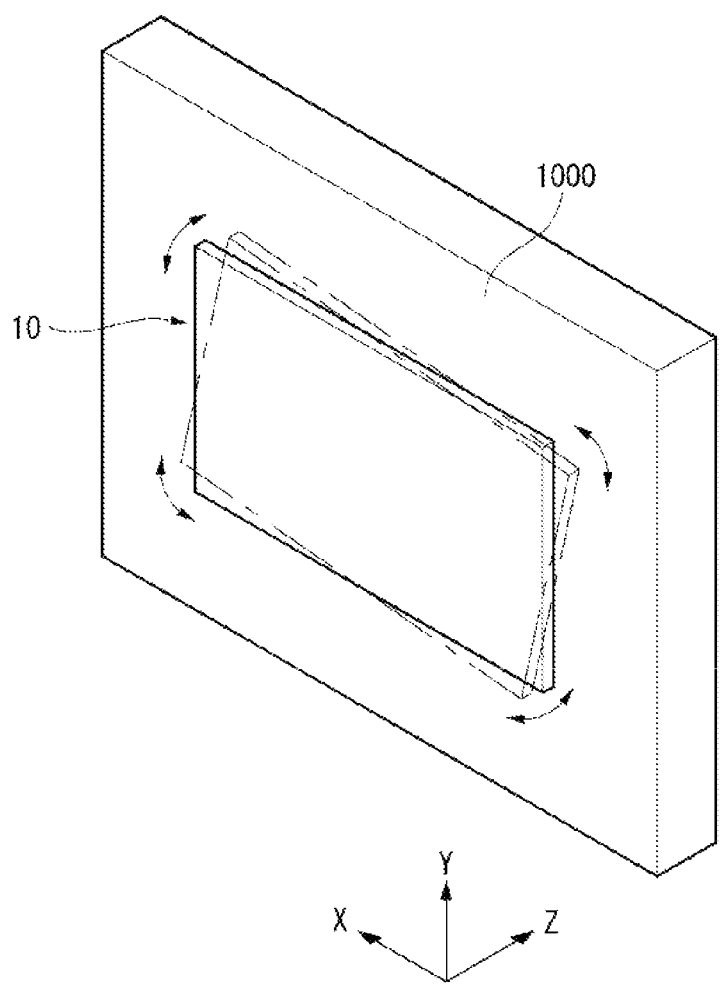

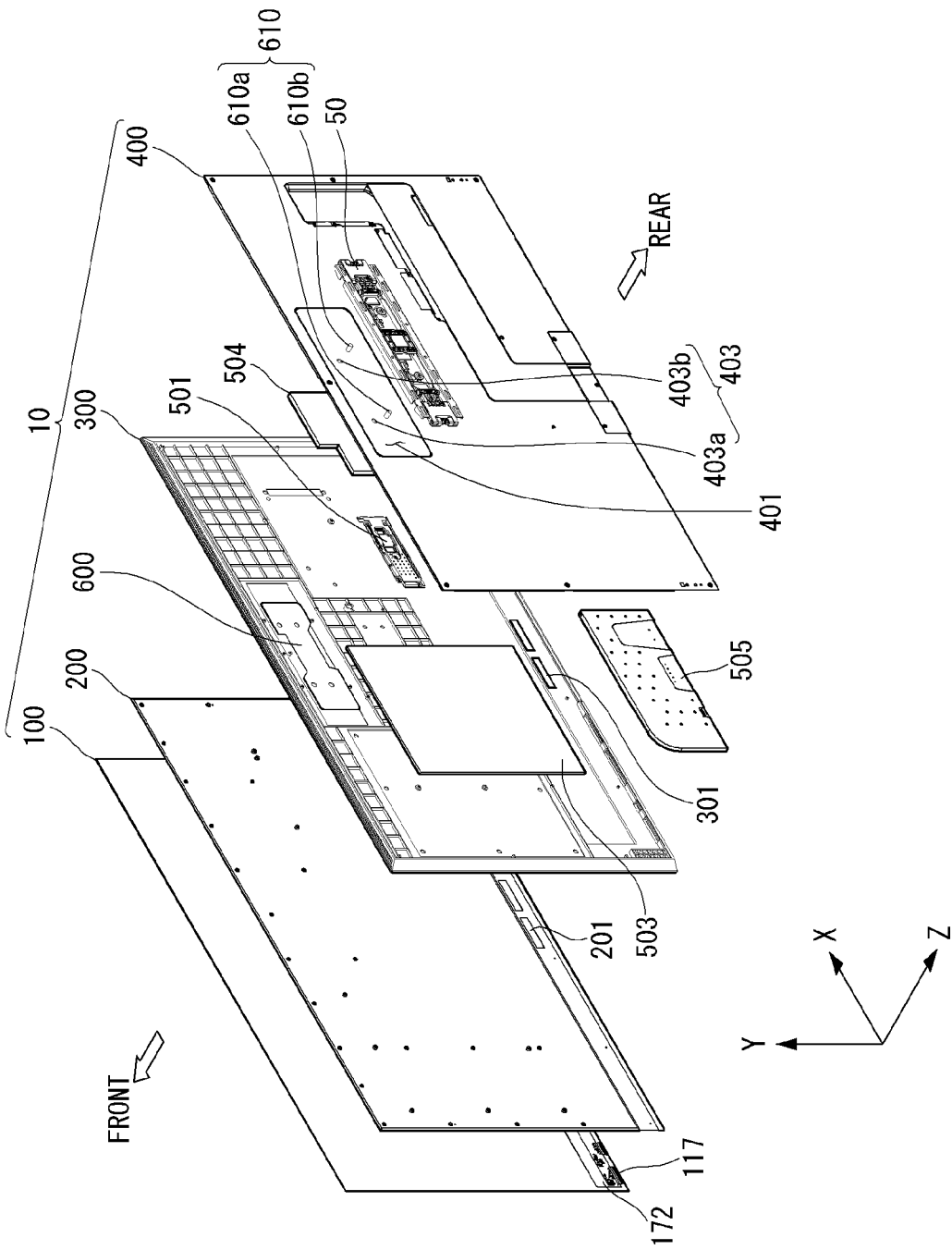
[FIG. 4]

[FIG. 5]
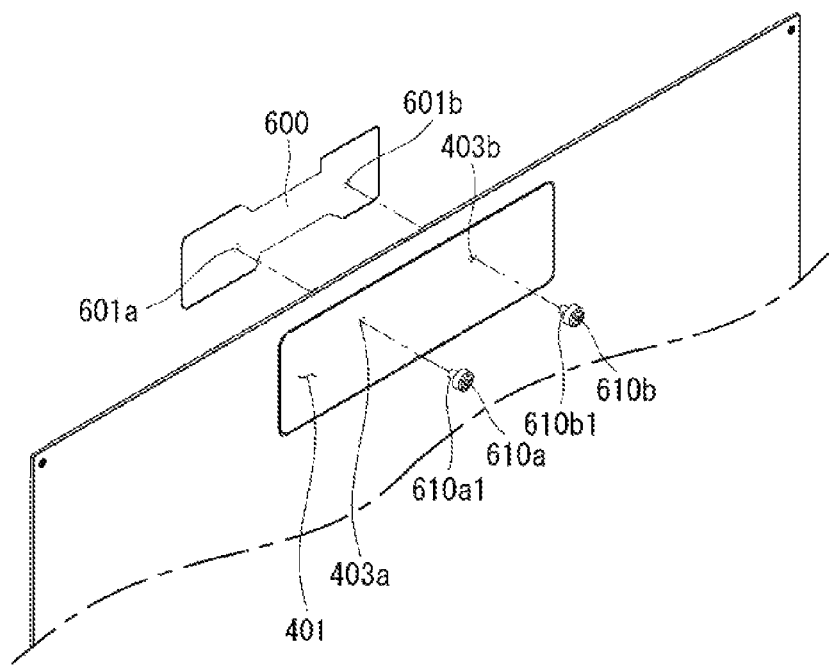

[FIG. 6]
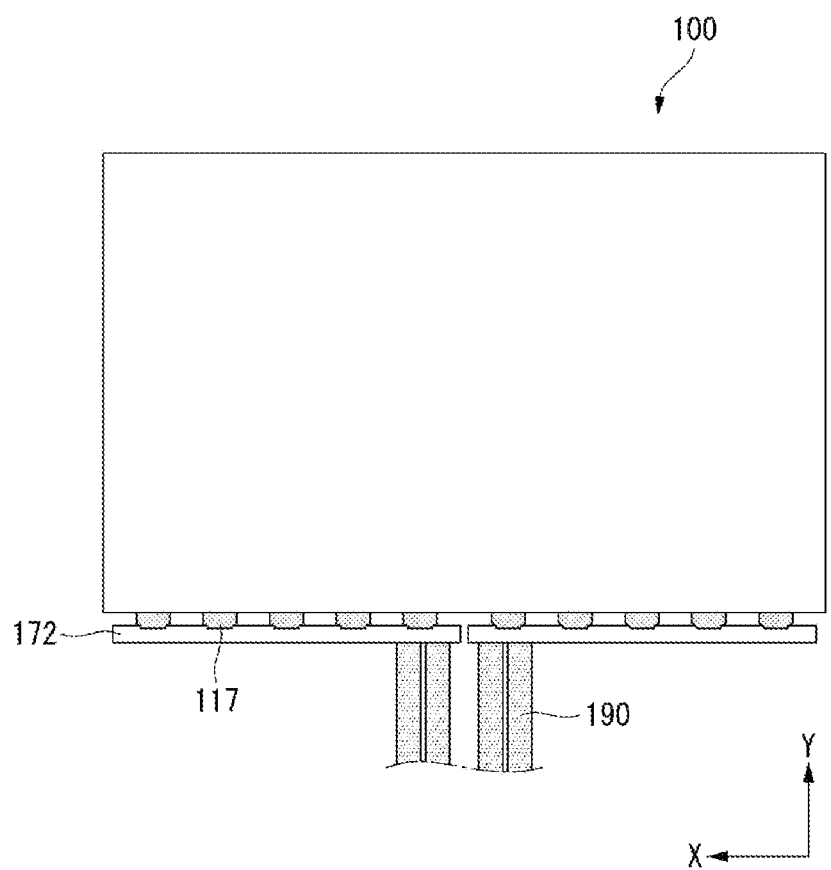

[FIG. 7]
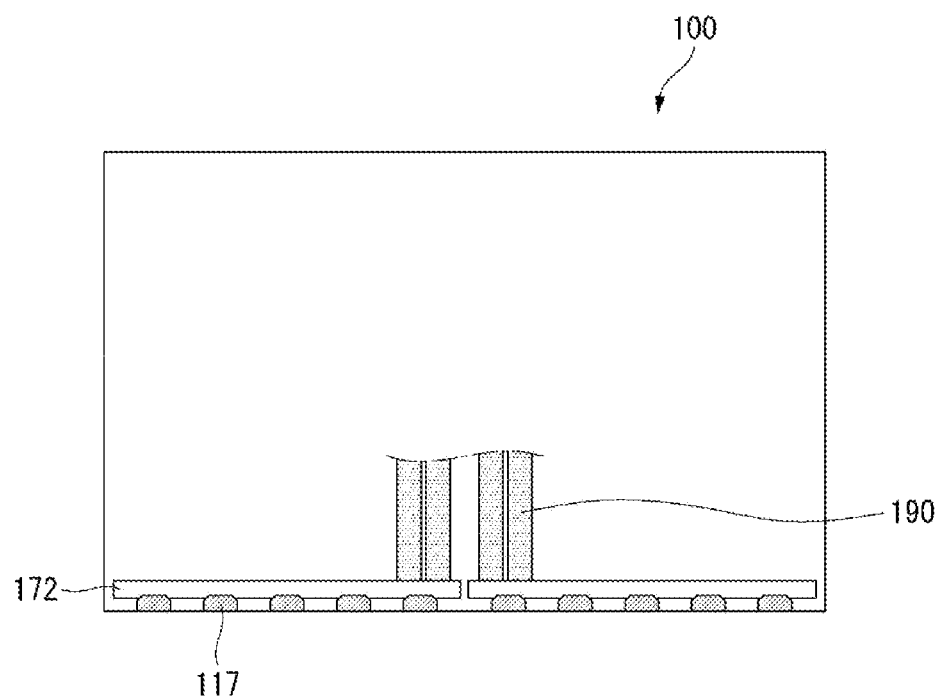

[FIG. 8]
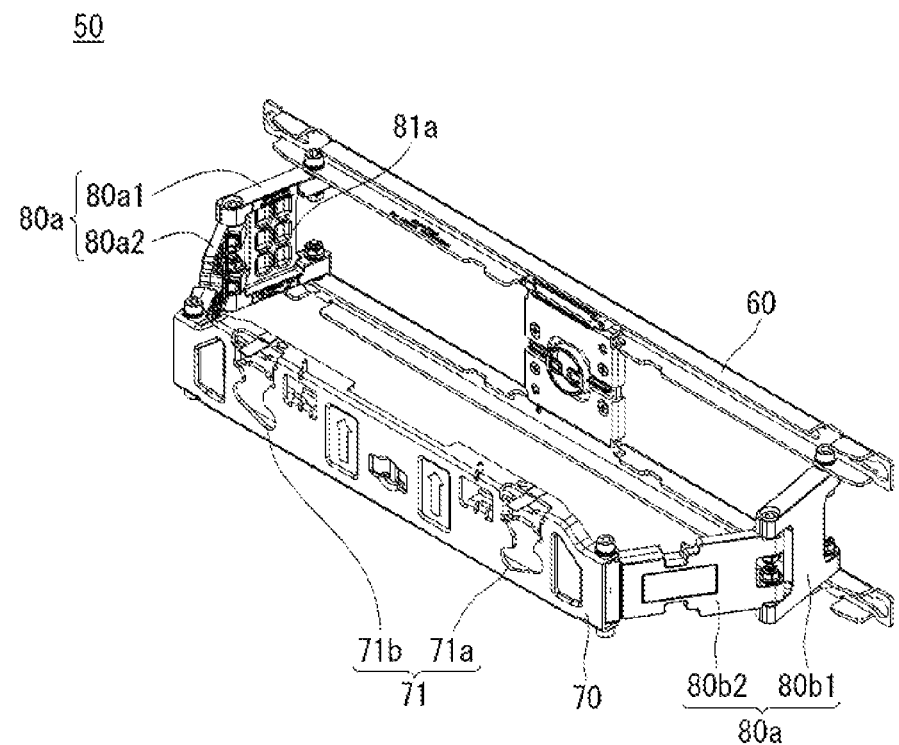

[FIG. 9]
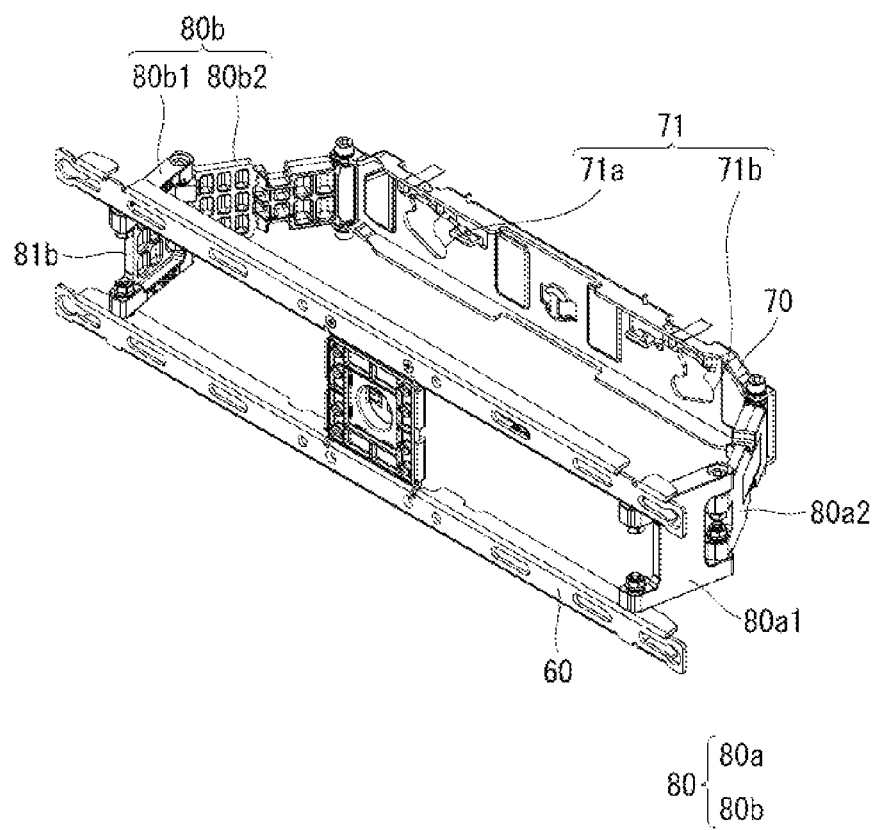

[FIG. 10]
Open state
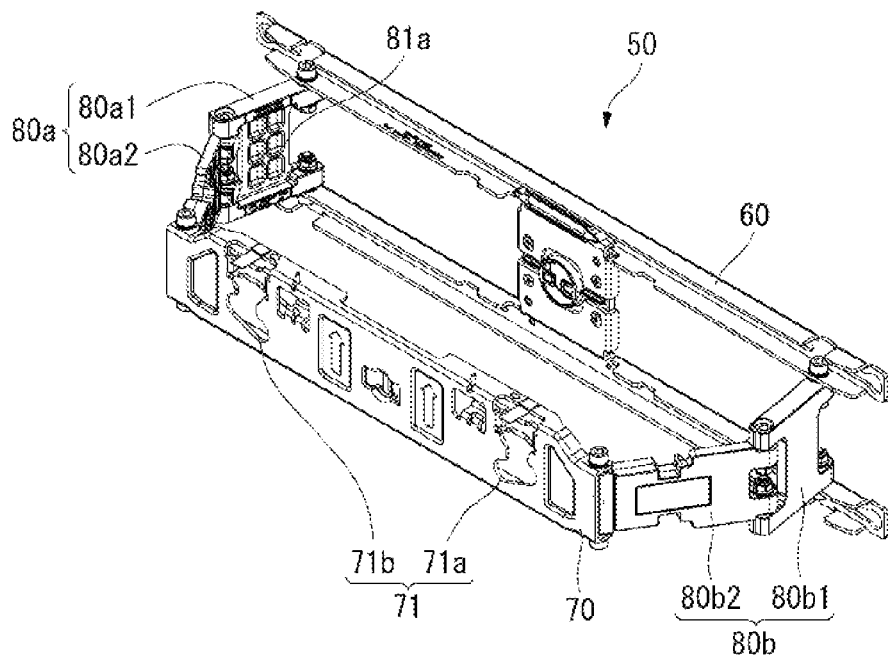
Close state
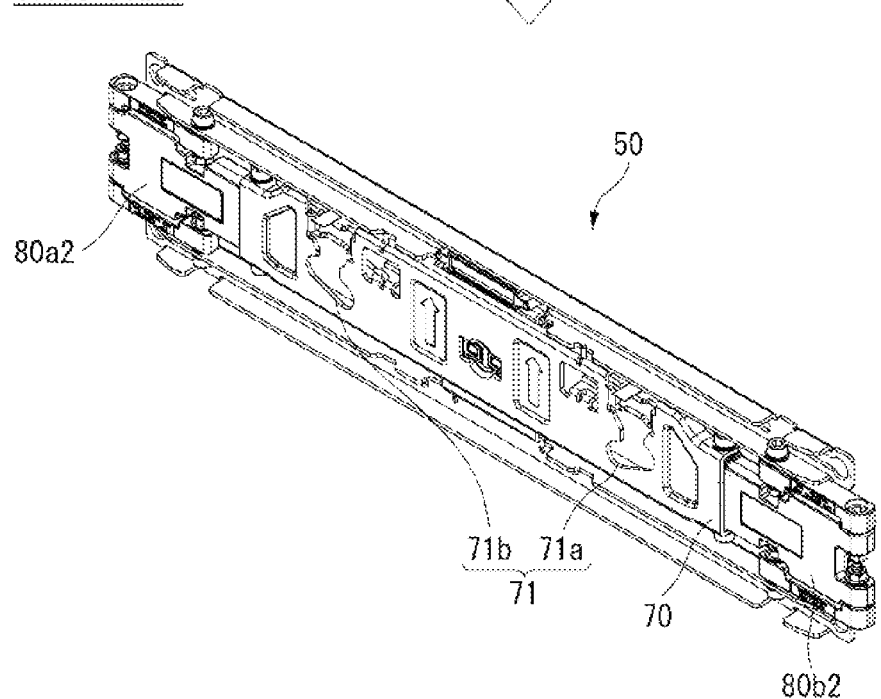

[FIG. 11]
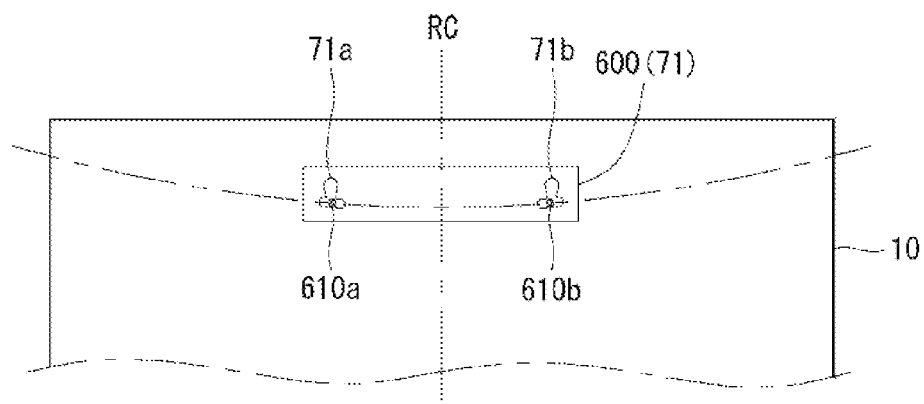
[FIG. 12]
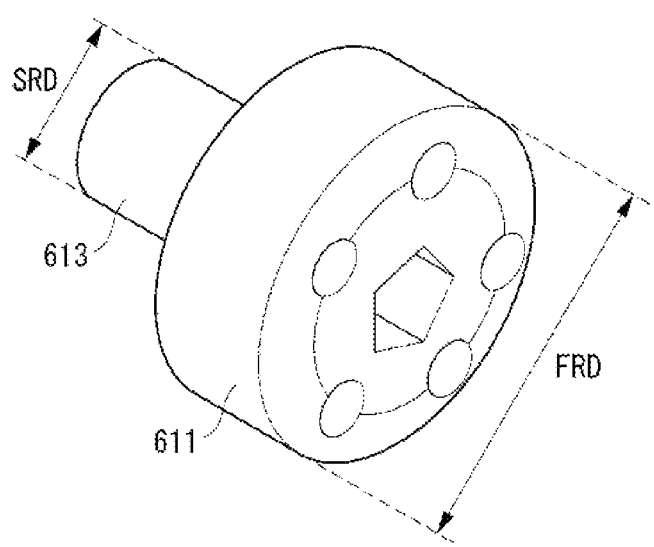

[FIG. 13]
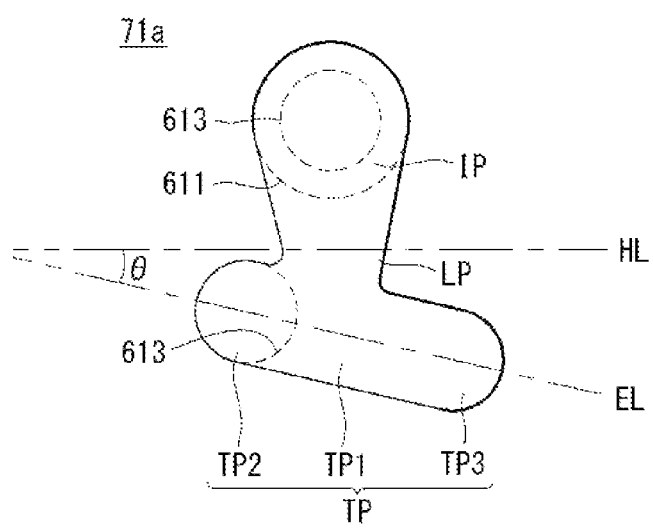

[FIG. 14]
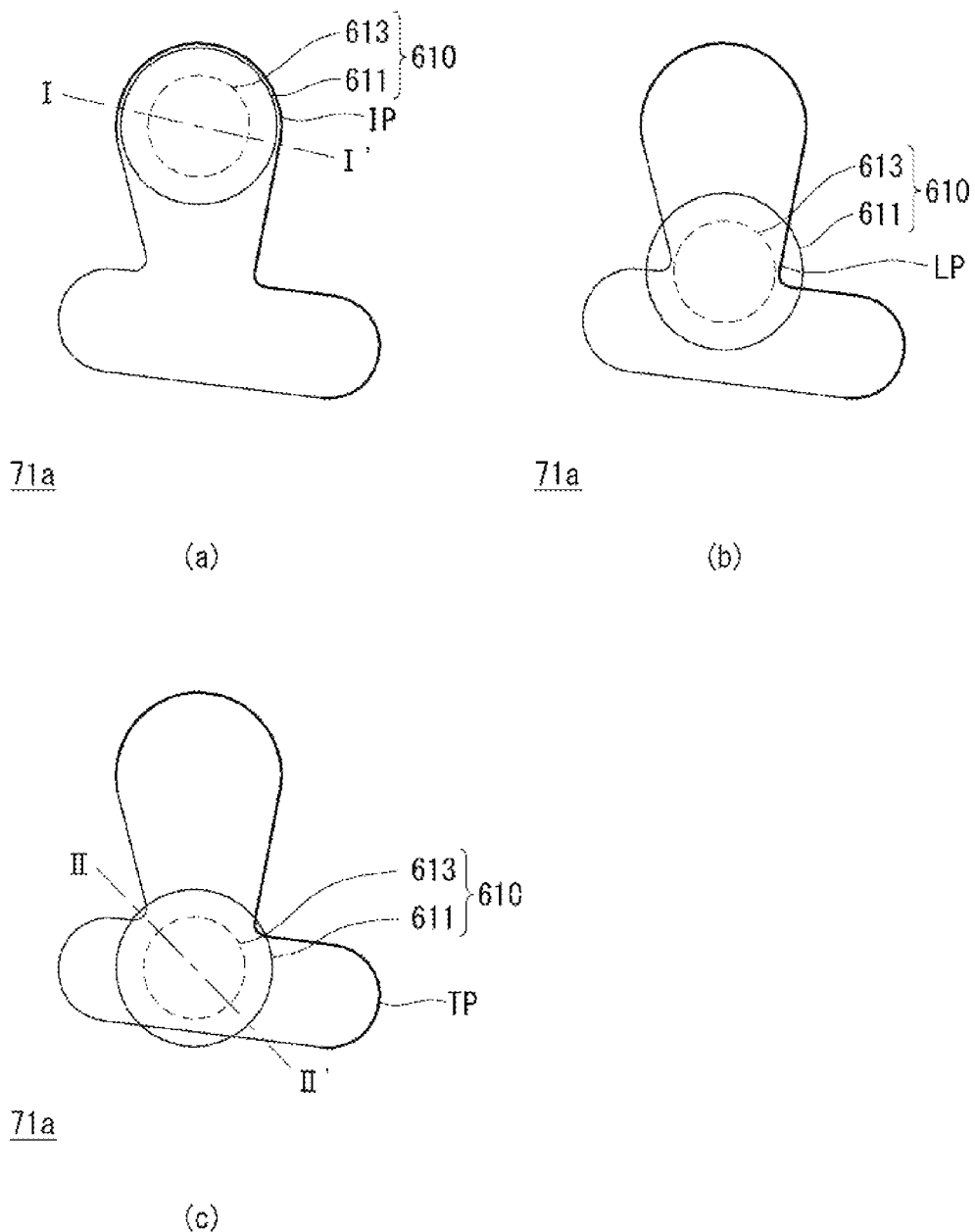

[FIG. 15]
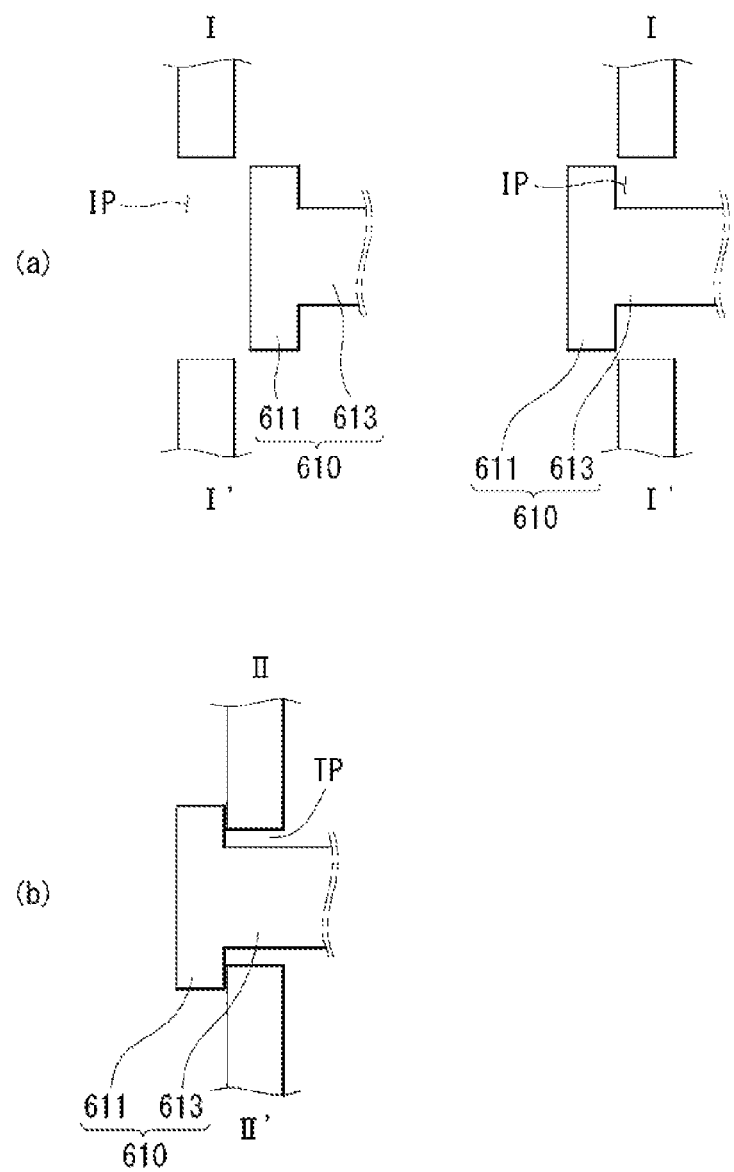

[FIG. 16]
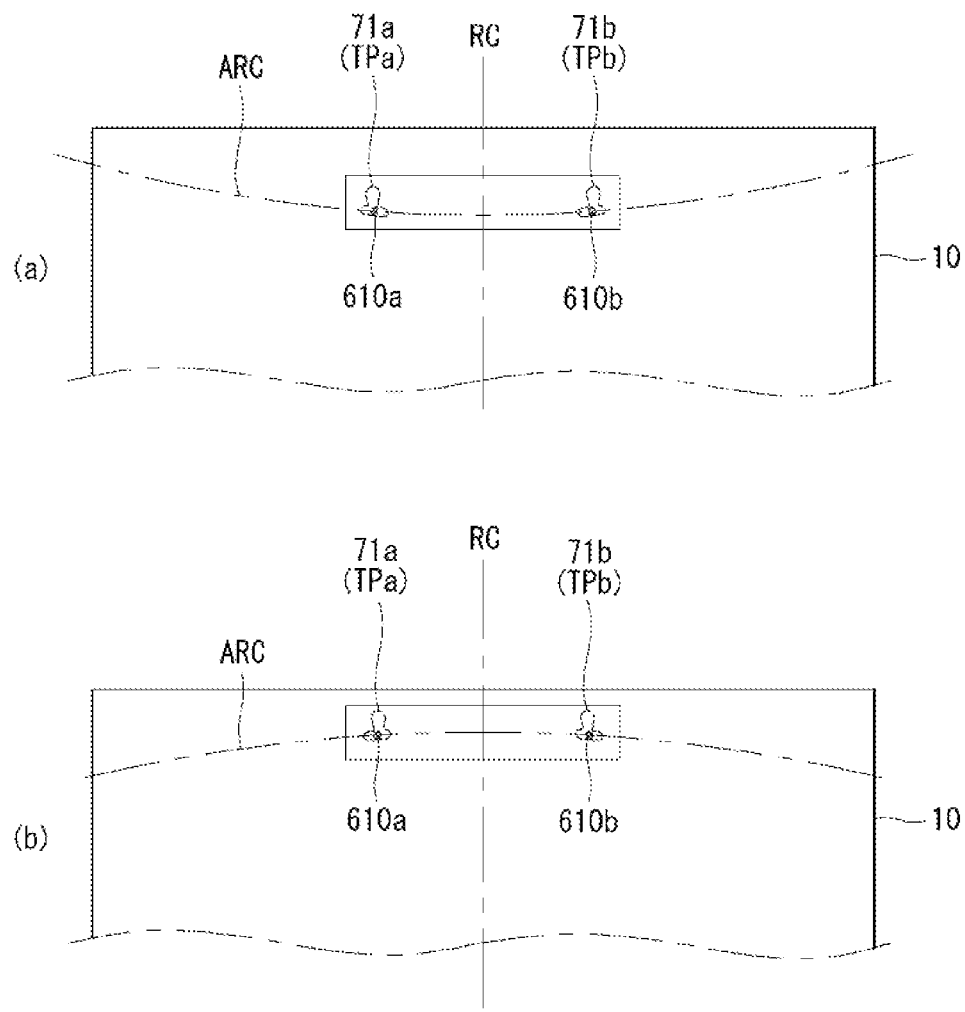

[FIG. 17]
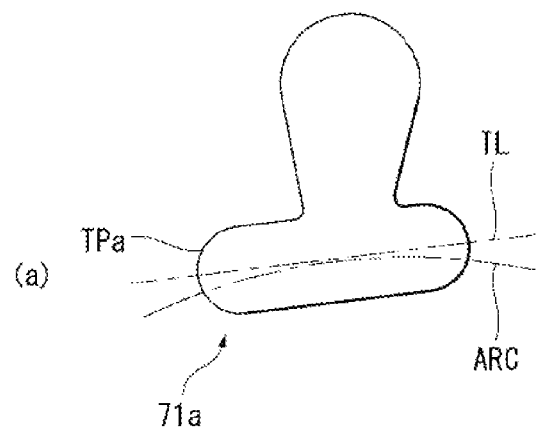
(a)
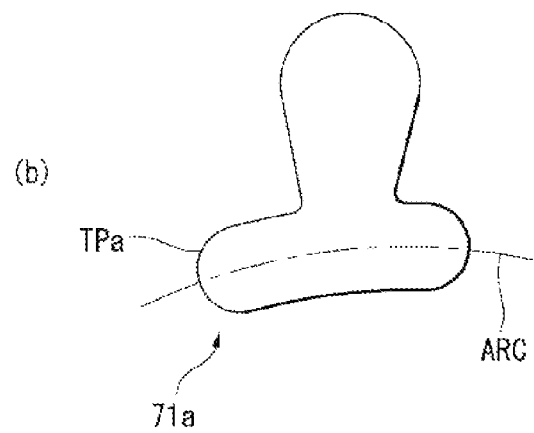
(b)

[FIG. 18]
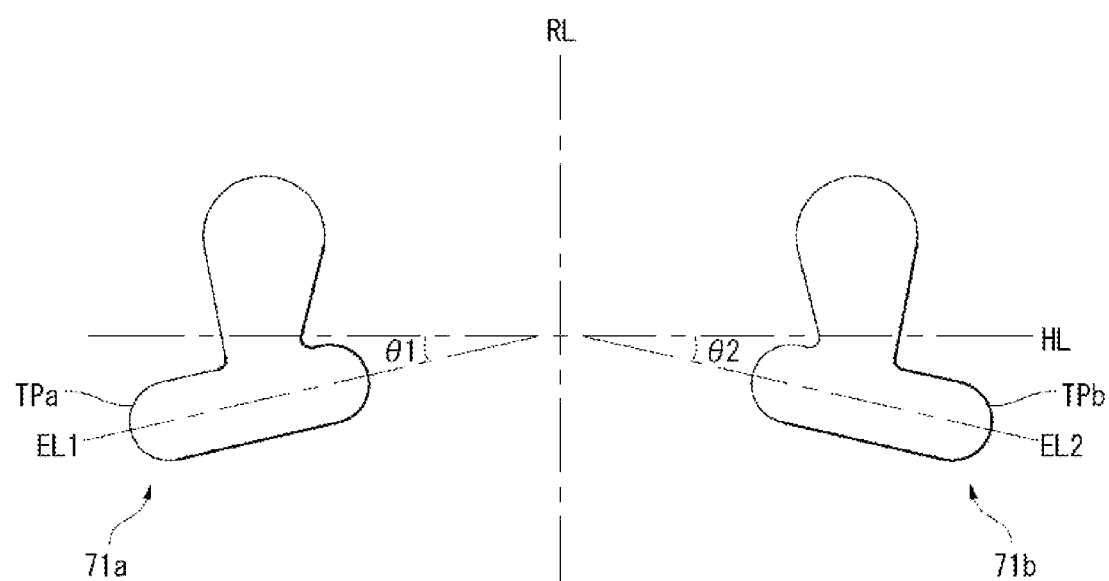

[FIG. 19]
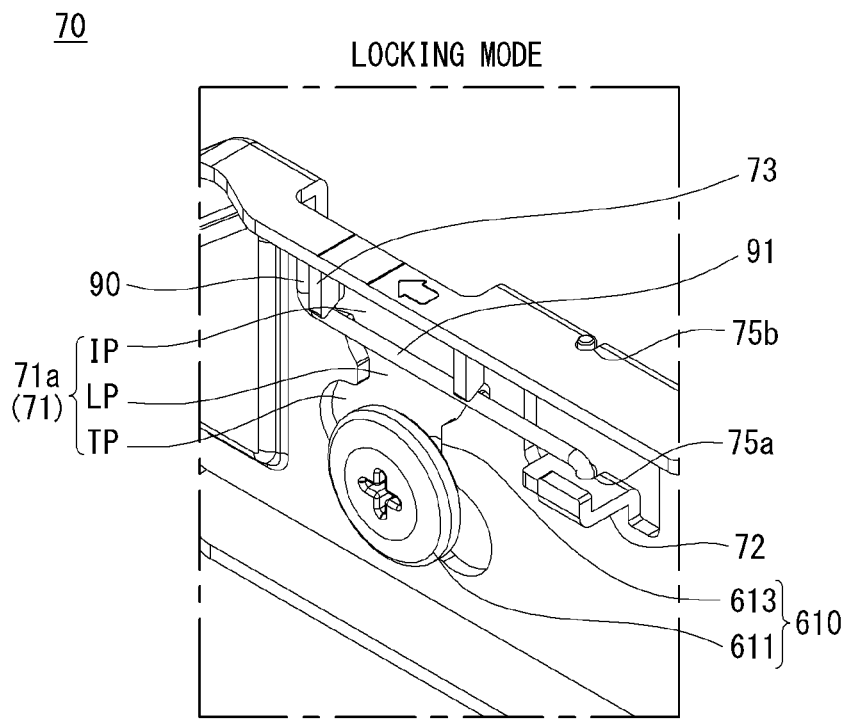
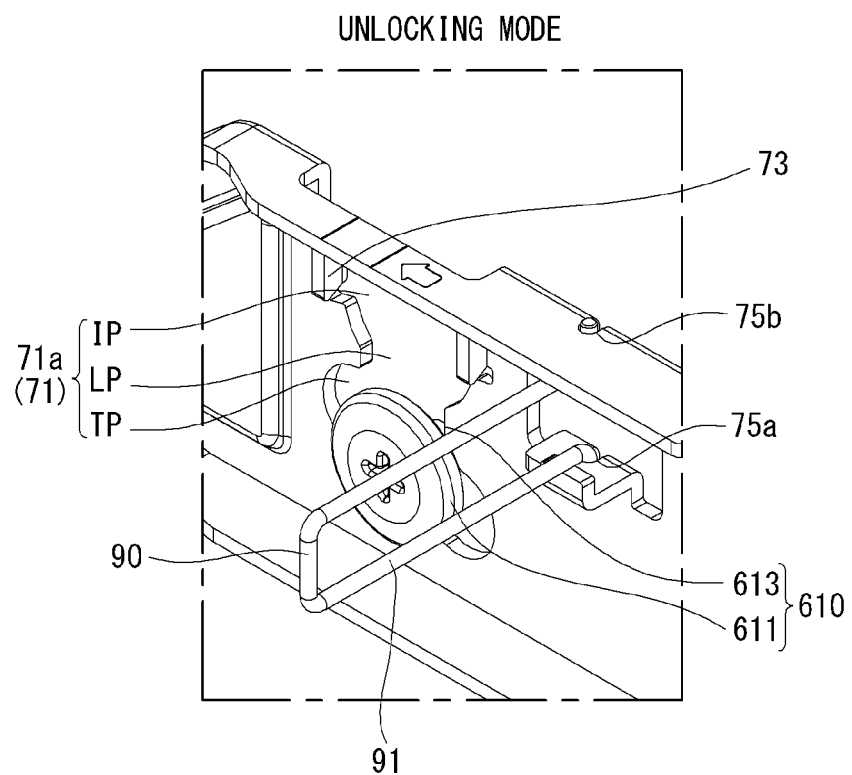

[FIG. 20]
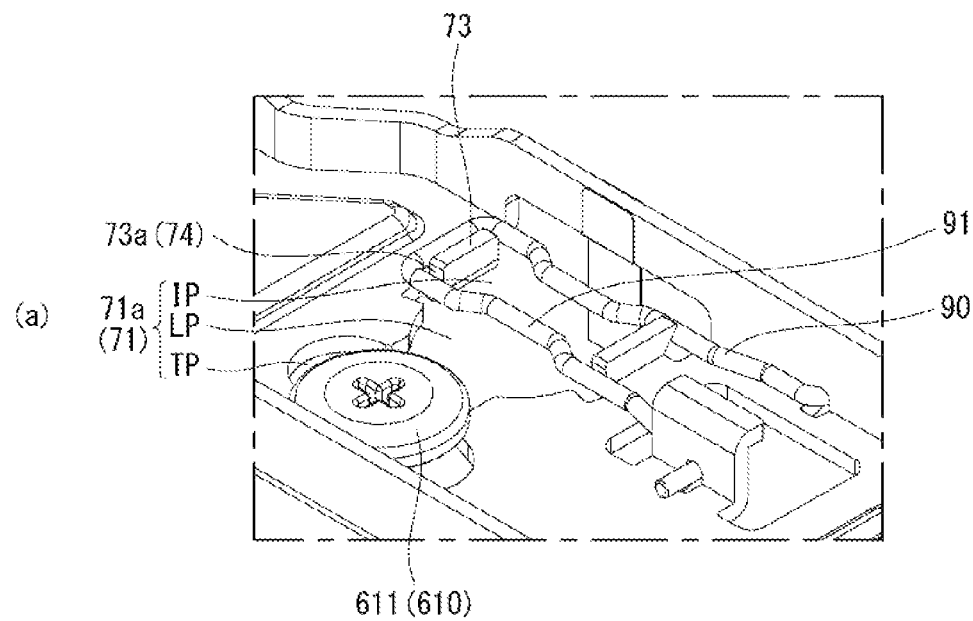
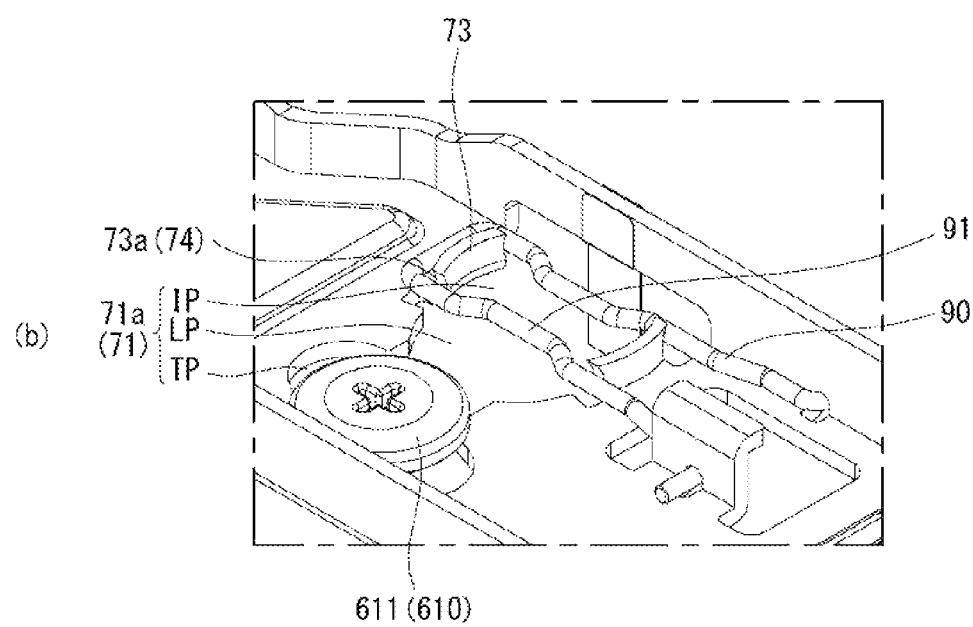

[FIG. 21]
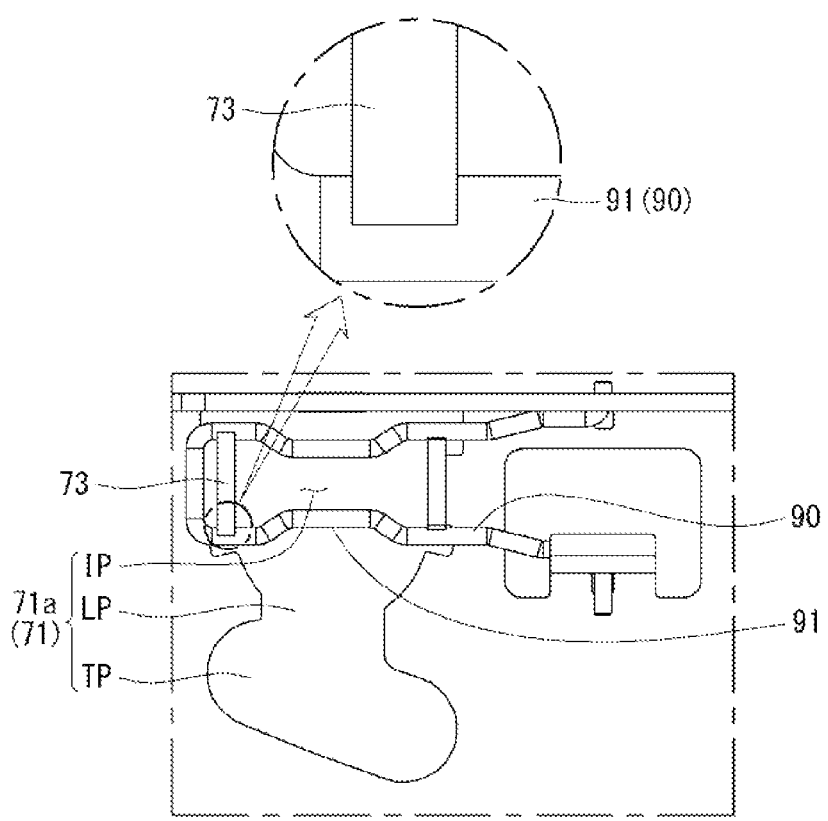

【FIG. 22】
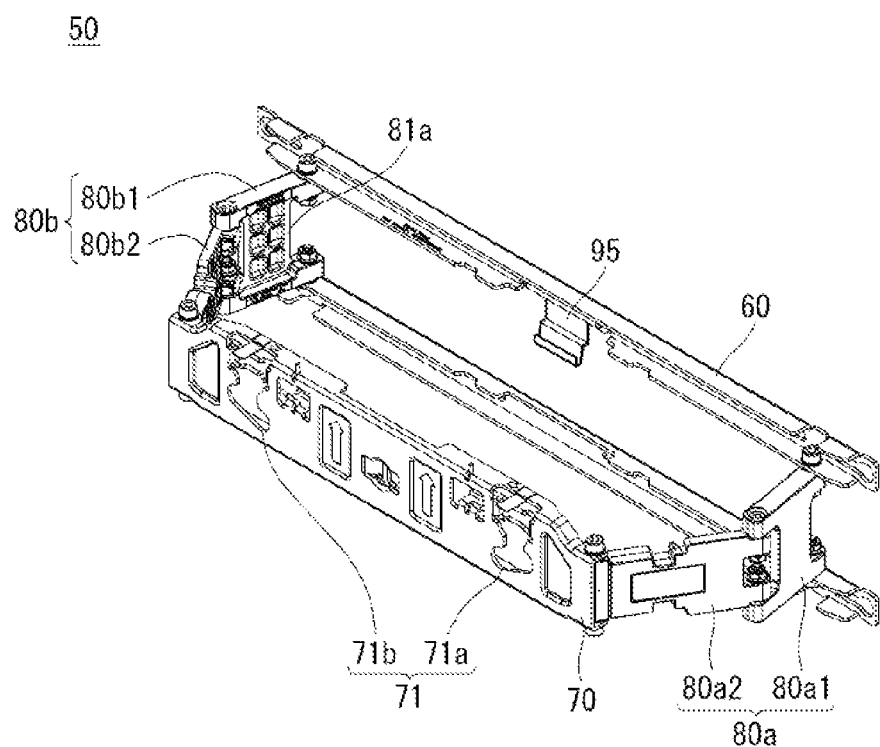
【FIG. 23】
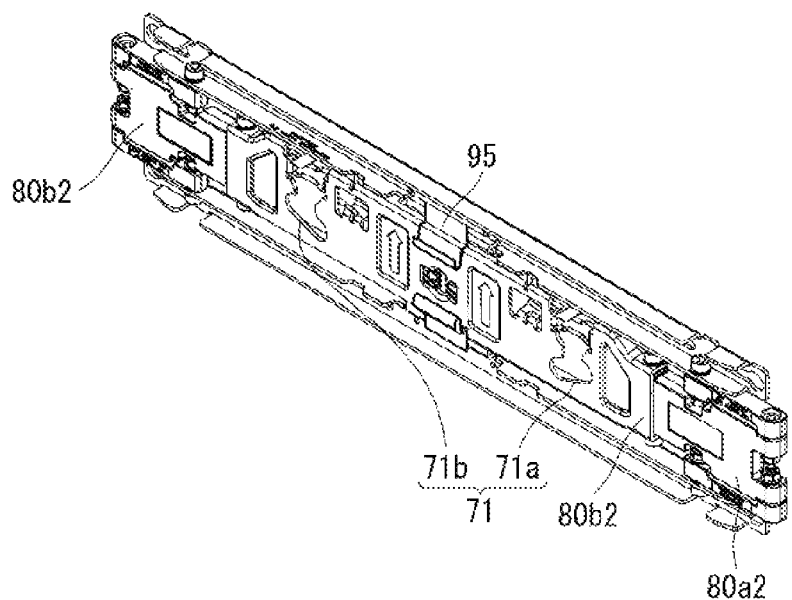

[FIG. 24]
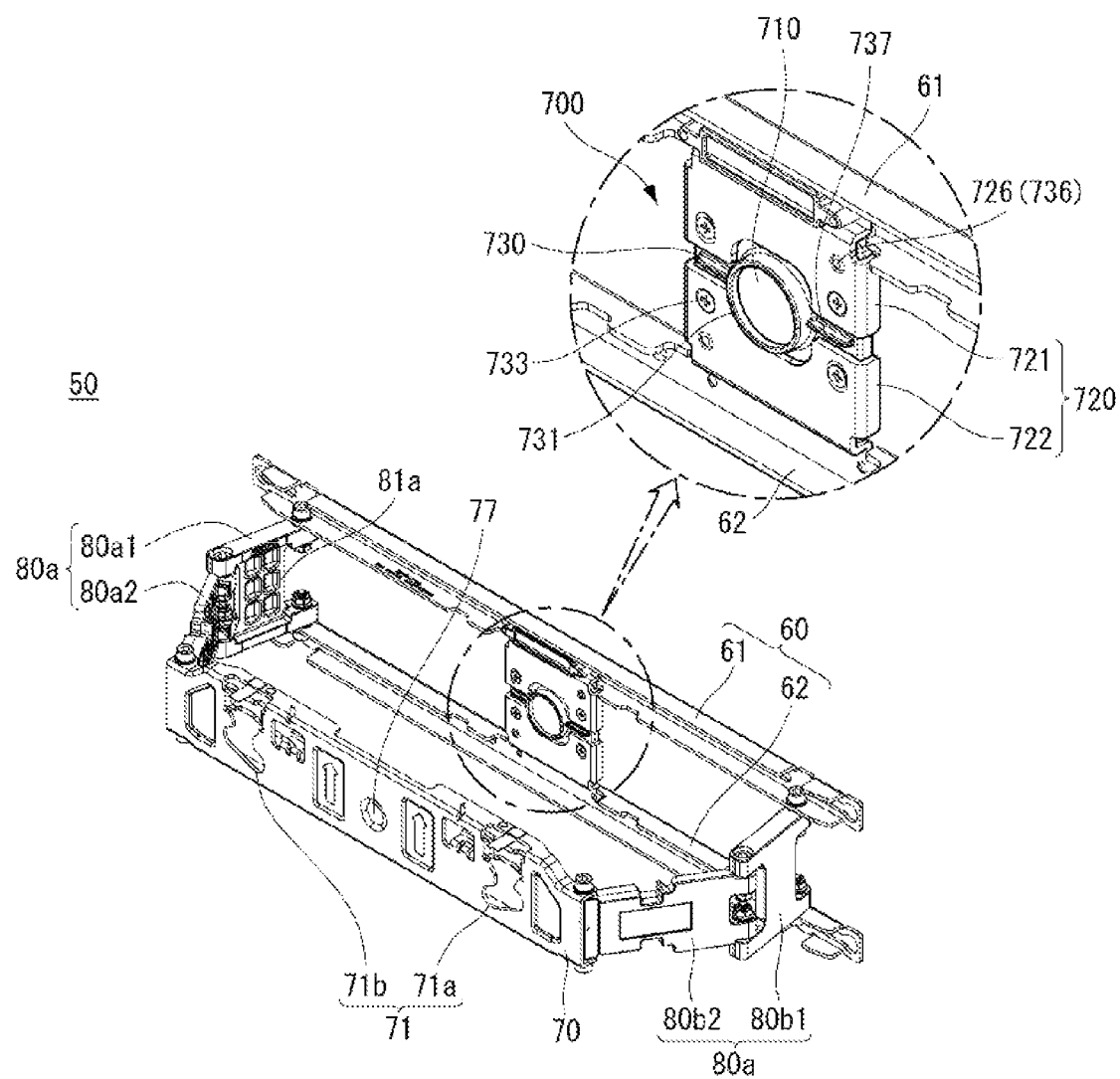

[FIG. 25]
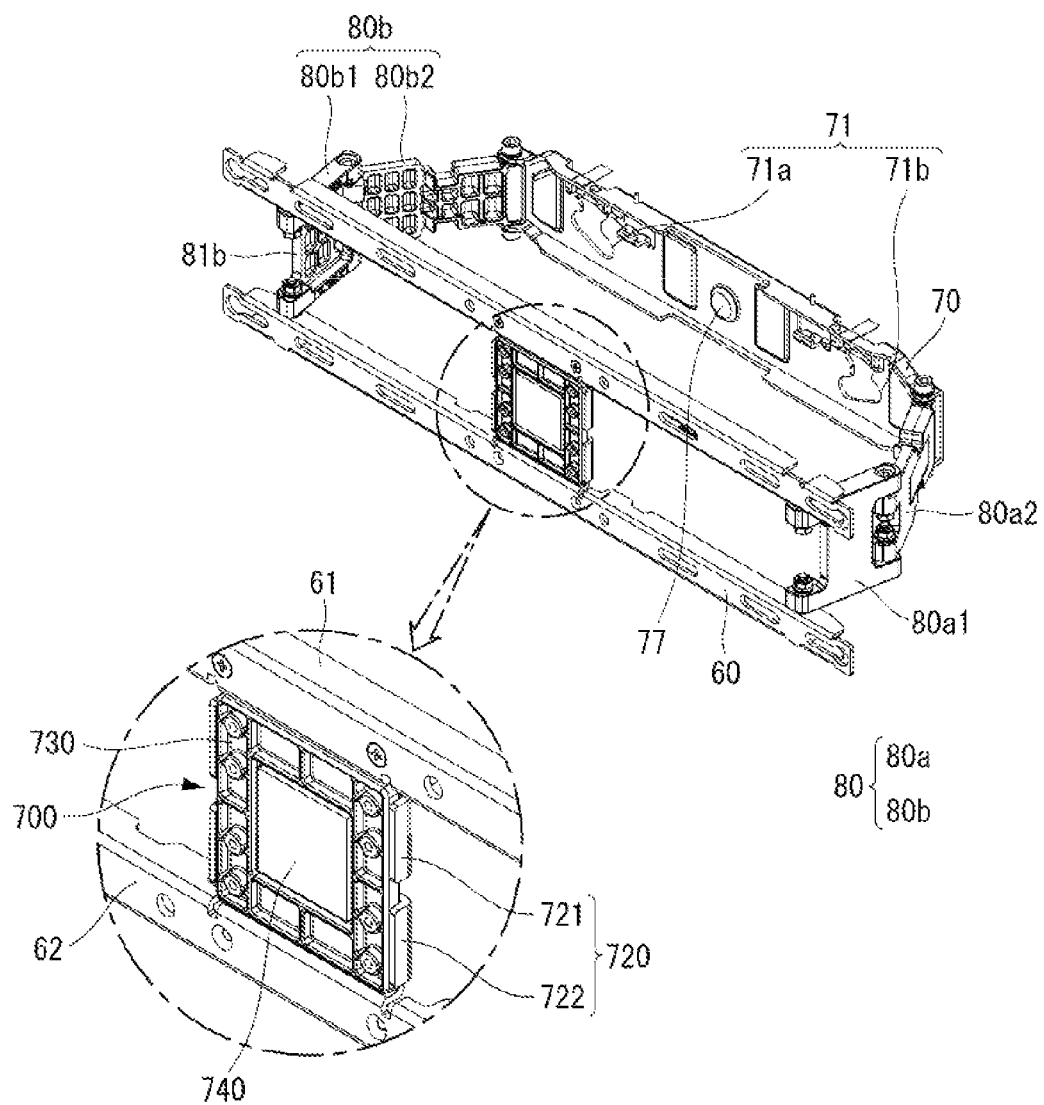

[FIG. 26]
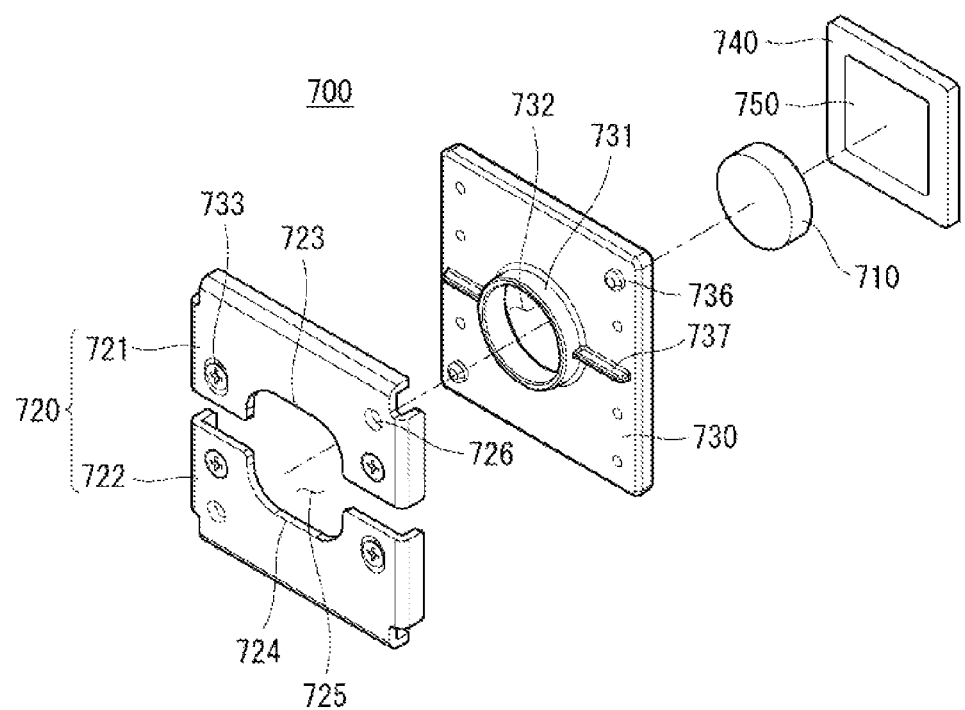

[FIG. 27]
Open state
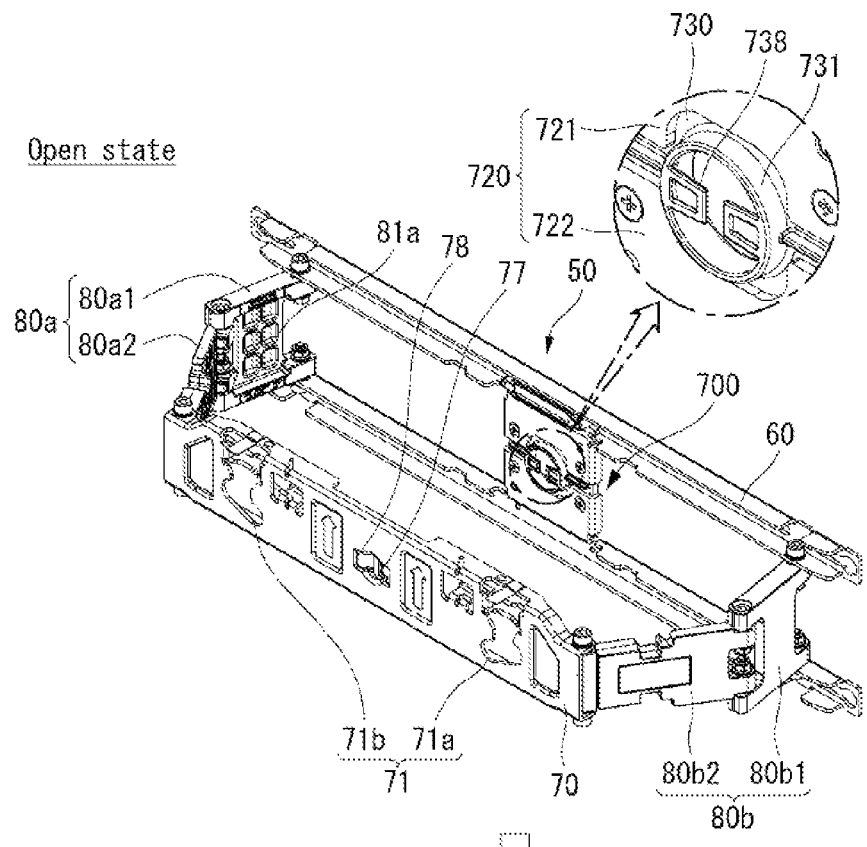
Close state
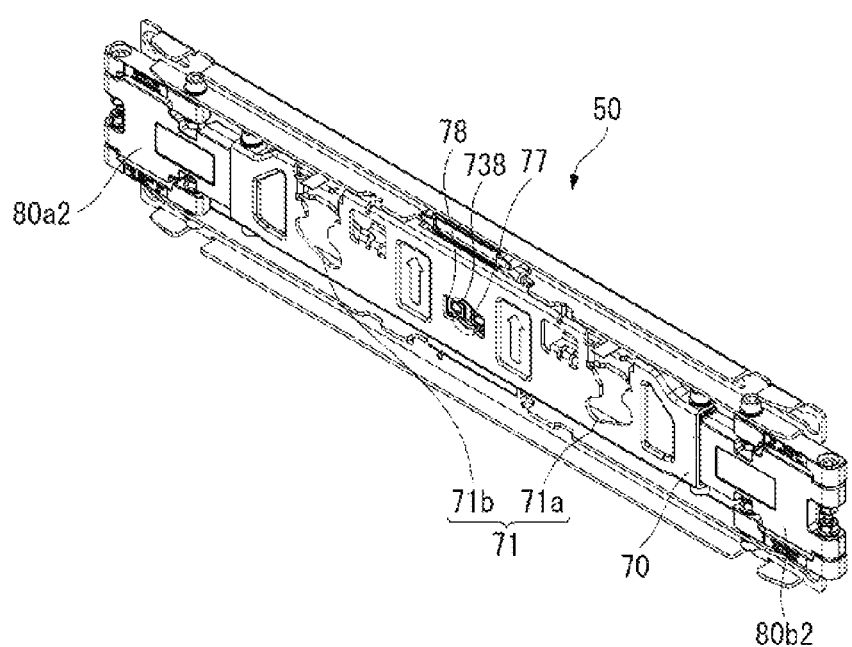

DISPLAY APPARATUS

CROSS-REFERENCE TO RELATED APPLICATIONS

This application is the National Stage filing under 35 U.S.C. 371 of International Application No. PCT/KR2020/000854, filed on Jan. 17, 2020, the contents of which are all incorporated by reference herein in its entirety.

TECHNICAL FIELD

The present disclosure relates to a display device.

BACKGROUND ART

With the development of the information society, various types of demands for display devices are increasing. Various display devices such as a liquid crystal display (LCD), a plasma display panel (PDP), an electroluminescent display (ELD), and a vacuum fluorescent display (VFD) are being recently studied in response to the various types of demands.

The display device may include a display module that implements an input image. The display module may be provided by combining a display panel and a case member for fixing the display panel.

The display module may be used by being hung on a fixture such as a wall, or used while supporting the display module on a stand and standing it on the floor. In order to hang the display module on the fixture, a wall mount assembly is required.

Recently, attempts are being made to implement the wall mount assembly as a multifunction module that can adjust the display module in up, down, left, and right directions depending on the user's position, in addition to the function of simply fixing the display module to the fixture.

DISCLOSURE

Technical Problem

The present disclosure provides a display device including a wall mount assembly that allows a display module to perform a translational movement, a swivel movement, and a tilting movement.

Technical Solution

In one aspect of the present disclosure, there is provided a display device comprising a display module including a display panel; at least a pair of first and second spacers positioned at a rear of the display module and fixed to the display module; and a wall mount assembly positioned at a rear of a back cover and fastened to the first and second spacers, the wall mount assembly configured to allow a movement of the first and second spacers, wherein the wall mount assembly includes a fixing portion fixed to a fixture; a frame portion including a pair of first and second tilting holes into which the first and second spacers are respectively inserted, and configured to guide a movement path of the first and second spacers; a link portion configured to connect the fixing portion to the frame portion; and an auxiliary locking portion fixed to the fixing portion, the auxiliary locking portion including at least one magnet attached to at least a part of the frame portion by a magnetic force.

The auxiliary locking portion may include a front body fixed to the fixing portion; and a middle body positioned at a rear of the front body and fixed to the front body. The front body may include a front hole passing through a thickness, and the middle body may include an accommodation protrusion that protrudes to be inserted into the front hole and includes a protrusion hole accommodating the magnet.

The fixing portion may include first and second bars that extend along a first direction and are spaced apart from each other by a predetermined distance in a second direction intersecting the first direction. The front body may include a first front body fixed to the first bar and extending toward the second bar; and a second front body fixed to the second bar, extending toward the first bar, and spaced apart from the first front body by a predetermined distance in the second direction. The first front body may include a first recess passing through a thickness, and the second front body may include a second recess passing through a thickness. The front hole may be formed by opening the first recess and the second recess toward each other.

The middle body may include at least one first alignment protrusion protruding toward the front body, and the first alignment protrusion may be inserted between the first front body and the second front body at an outside of the front hole.

The middle body may include at least one second alignment protrusion protruding toward the front body, and the front body may include an accommodation hole into which the second alignment protrusion is inserted.

The auxiliary locking portion may include a rear body fixed to a rear of the middle body, and the rear body may be formed of a non-magnetic material.

The auxiliary locking portion may include an adhesive member interposed between the middle body and the rear body and configured to fix the middle body to the rear body and fix the magnet to the rear body.

The frame portion may include an auxiliary foaming portion that protrudes toward the auxiliary locking portion and is insertable into the protrusion hole.

The accommodation protrusion may include at least one auxiliary stopper that extends from an inner peripheral surface of the accommodation protrusion toward an inside of the protrusion hole and is positioned at a front of the magnet. The frame portion may include a foaming hole into which the auxiliary stopper is inserted.

The foaming hole may be formed in the auxiliary foaming portion.

The wall mount assembly may include a locking portion configured to selectively restrict the movement path of the first and second spacers inserted into the first and second tilting holes.

Each of the first and second tilting holes may include an inlet portion configured to enable to insert and withdraw the spacer; and a guide portion positioned at a lower side of the inlet portion, the spacer inserted through the inlet portion being seated on the guide portion. The locking portion may include a blocking portion that is rotatably fastened to the frame portion and is correspondingly positioned between the inlet portion and the guide portion.

Each of the first and second tilting holes may include a movement portion configured to connect the inlet portion to the guide portion, and the blocking portion may be positioned based on the movement portion.

Each of one end and other end of the locking portion may be rotatably fastened to the frame portion.

Each of the first and second spacers may include a spacer head having a first diameter; and a spacer neck that extends from the spacer head and has a second diameter less than the first diameter. The inlet portion may have a hole area greater than the first diameter, and the guide portion may have a hole area that is less than the first diameter and is greater than the second diameter.

The guide portion may include a seating portion; and first and second extensions extending from the seating portion in one direction. Each of the first and second extensions may extend in a reverse direction from the seating portion.

An extension line traveling in an extension direction of the guide portion and a horizontal line traveling in a horizontal direction of the guide portion may intersect each other, and an angle formed by the extension line and the horizontal line may be a tilting angle.

Each of the guide portions of the first and second tilting holes may extend in a straight line form along a tangential direction of an imaginary arc passing centers of the guide portions of the first and second tilting holes, or may extend in a curved form along an extension direction of the imaginary arc.

The imaginary arc may be convexly curved upwardly or convexly curved downwardly.

The imaginary arc may be an arc that is a part of a circumference of a circle with an imaginary center point, and the imaginary center point may be positioned on a reference line crossing a center of the display module in an up-down direction.

The first and second tilting holes may be symmetrical with respect to the reference line crossing the center of the display module in the up-down direction.

The display device may further comprise an auxiliary locking portion including one end fixed to the fixing portion and having a predetermined elasticity. Other end of the auxiliary locking portion may extend downwardly from the one end of the auxiliary locking portion and may be positioned to overlap at least a part of the frame portion in a front-rear direction.

The display module may include a module cover positioned at a rear of the display panel; a back cover positioned at a rear of the module cover, the back cover including first and second open holes positioned corresponding to the first and second spacers; and a wall mount plate positioned between the module cover and the back cover and fixed to the module cover. The first and second spacers may be respectively fixed to the wall mount plate through the first and second open holes at a rear of the back cover.

The back cover may include a foaming portion overlapping the wall mount plate, and at least a part of the wall mount assembly may be inserted into the foaming portion.

The link portion may include first and second links that are rotatably coupled to each other based on an imaginary first axis extending in the up-down direction. One end of the first link may be rotatably coupled to the fixing portion based on an imaginary second axis extending in the up-down direction, and one end of the second link may be rotatably coupled to the frame portion based on an imaginary third axis extending in the up-down direction.

The first link may include an accommodation groove in which at least a part of the second link is accommodated.

Advantageous Effects

A display device according to an embodiment of the present disclosure provides can include a wall mount assembly that allows a display module to perform a translational movement, a swivel movement, and a tilting movement. Hence, since a user can change a position of the display module as needed, the ease of use of the display device can be remarkably improved.

DESCRIPTION OF DRAWINGS

FIG. 1 is a perspective view schematically illustrating a display device according to an embodiment of the present disclosure.

FIG. 2 is a perspective view schematically illustrating a display module according to an embodiment of the present disclosure.

FIGS. 3a to 3c illustrate examples of changing a position of a display module according to an embodiment of the present disclosure.

FIG. 4 is an exploded perspective view illustrating a display device according to an embodiment of the present disclosure.

FIG. 5 schematically illustrates a wall mount plate and a spacer.

FIGS. 6 and 7 illustrate a rear surface of a display panel according to an embodiment of the present disclosure.

FIGS. 8 and 9 are perspective views illustrating a wall mount assembly according to an embodiment of the present disclosure.

FIG. 10 illustrates an operation state (a folded state or an unfolded state) of a link portion according to an embodiment of the present disclosure.

FIG. 11 illustrates a structure of a frame portion and a relationship between the frame portion and a spacer according to an embodiment of the present disclosure.

FIG. 12 illustrates a shape of a spacer according to an embodiment of the present disclosure.

FIGS. 13 to 15 illustrate a structure of a spacer and a tilting hole according to an embodiment of the present disclosure.

FIGS. 16 to 18 illustrate a position relationship and a shape of a pair of spacers according to the present disclosure.

FIGS. 19 to 21 illustrate a locking portion according to an embodiment of the present disclosure.

FIGS. 22 and 23 illustrate an auxiliary locking portion according to an embodiment of the present disclosure.

FIGS. 24 to 27 illustrate an auxiliary locking portion according to another embodiment of the present disclosure.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

A display device according to the present disclosure may be implemented as a liquid crystal display (LCD), a field emission display (FED), a plasma display panel (PDP), an organic light emitting diode (OLED) display, an electrophoresis (EPD), a quantum dot display (QDD), and the like. Hereinafter, for convenience of description, the present disclosure is described using a display device including an organic light emitting diode element as an example.

FIG. 1 is a perspective view schematically illustrating a display device according to an embodiment of the present disclosure. FIG. 2 is a perspective view schematically illustrating a display module according to an embodiment of the present disclosure. FIGS. 3a to 3c illustrate examples of changing a position of a display module according to an embodiment of the present disclosure. FIG. 4 is an exploded perspective view illustrating a display device according to an embodiment of the present disclosure. FIG. 5 schematically illustrates a wall mount plate and a spacer. FIGS. 6 and 7 illustrate a rear surface of a display panel according to an embodiment of the present disclosure.

Referring to FIGS. 1 and 2, a display device may include a display module 10 and a wall mount assembly 50.

The display module 10 may include a display panel and a case member coupled to the display panel. The display module 10 may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the present disclosure illustrate and describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display module 10, and a second direction DR2 may be a direction parallel to the short sides SS1 and SS2 of the display module 10.

The first direction DR1 may be parallel to a horizontal axis. The first direction DR1 may be referred to as a first horizontal axis. The second direction DR2 may be parallel to a vertical axis. The second direction DR2 may be referred to as the vertical axis. A third direction DR3 may be parallel to the horizontal axis. The third direction DR3 may be referred to as a second horizontal axis.

A side of the display module 10 on which an image is displayed may be referred to as a forward direction or a front surface. When the display module 10 displays an image, a side of the display module 10 at which the image cannot be observed may be referred to as a rearward direction or a rear surface. The third direction DR3 may be a back-and-forth direction.

When the display module 10 is viewed from the forward direction or the front surface, the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

A lateral side of the display module 10 may indicate at least one of the upper surface, the lower surface, the right surface, and the left surface of the display module 10.

Further, the first long side LS1, the second long side LS2, the first short side SS1, and the second short side SS2 may be referred to as edges of the display module 10. Positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

The wall mount assembly 50 may be fixed to a fixture 1000 such as a wall. That is, the wall mount assembly 50 may be fixed to an arbitrary predetermined position such as a wall, and thus its movement may be constrained. The wall mount assembly 50 may be fixed to an attachment surface of the fixture 1000 through a fixing member such as a screw. The attachment surface may refer to one surface of the fixture 1000 to which the wall mount assembly 50 is fixed.

The wall mount assembly 50 may fix the display module 10 to the fixture 1000. The wall mount assembly 50 may function to change a position of the display module 10 in response to a position of a user according to the user's needs. That is, the wall mount assembly 50 may allow changes in the position of the display module 10 within a preset range while fixing the display module 10 to the fixture 1000.

The movement of the display module 10 and the wall mount assembly 50 may be due to a physical external force directly provided by the user. For example, when the user grips the display module 10 and then applies a force to the display module 10, the position of the display module 10 may be changed within a range allowed by the wall mount assembly 50. Alternatively, the movement of the wall mount assembly 50 may be controlled through a controller in response to a predetermined specific signal. That is, changes in a state of the wall mount assembly 50 may be controlled by a selected driving device and driving circuit.

As illustrated in FIG. 3*a*, the wall mount assembly 50 may allow a translational movement of the display module 10. The wall mount assembly 50 may allow the display module 10 to be spaced from the fixture 1000 forward by a predetermined distance, or allow the display module 10 to approach or contact the fixture 1000. That is, the wall mount assembly 50 may allow the display module 10 to move forward and backward within a preset range.

As illustrated in FIG. 3*b*, the wall mount assembly 50 may allow a swivel movement of the display module 10. The wall mount assembly 50 may allow the other side of the display module 10 to move in a state where a movement of one side of the display module 10 is restricted. For example, the wall mount assembly 50 may allow the right side of the display module 10 to move forward or backward in a state where a movement of the left side of the display module 10 is constrained to a preset position.

As illustrated in FIG. 3*c*, the wall mount assembly 50 may allow a tilting movement of the display module 10. The wall mounting assembly 50 may move up and down at least one side of the display module 10 from an initial state (or a reference state) and tilt the display module 10 in one direction compared to the initial state.

Referring to FIGS. 4 and 5, the display device may include the display module 10 and the wall mount assembly 50. The display module 10 may include the display panel and the case member.

A display panel 100 may be provided on the front surface of the display device and may display an image. The display panel 100 may divide the image into a plurality of pixels and adjust hue, brightness, and saturation for each pixel to output the image. The display panel 100 may be divided into an active area in which the image is displayed, and an inactive area in which the image is not displayed.

The display panel 100 may include an OLED display panel. The display panel 100 may emit light by itself. The display panel 100 may have a very thin thickness.

The case member may include an inner plate 200, a module cover 300, a back cover 400, and a wall mount plate 600.

The inner plate 200 may be disposed behind the display panel 100. The inner plate 200 may be attached to a rear surface of the display panel 100. The inner plate 200 may be coupled to the rear surface of the display panel 100 by one or more adhesive members.

The inner plate 200 may provide rigidity to the display panel 100. The inner plate 200 may receive heat from the display panel 100 and dissipate the heat. The inner plate 200 may have high thermal conductivity. The inner plate 200 may include metal. The inner plate 200 may include aluminum or aluminum alloy.

The module cover 300 may be positioned in the rear of the inner plate 200. The module cover 300 may form an inner space at the front. The display panel 100 and the inner plate 200 may be accommodated in the inner space provided at the front of the module cover 300. The module cover 300 may cover at least a part of the side of each of the inner plate 200 and the display panel 100. The inner space provided at the front of the module cover 300 may be referred to as a front accommodation portion.

The module cover 300 may form an inner space at the rear. An electronic component may be accommodated in the inner space provided at the rear of the module cover 300. The electronic component may include a timing controller board 501, a power supply 503, a main board 504, a speaker 505, and the like. The electronic component may be fixed to the rear of the module cover 300. The inner space provided at the rear of the module cover 300 may be referred to as a rear accommodation portion. The electronic component may be seated in the rear accommodation portion. The rear accommodation portion may be divided into a plurality of portions to provide a plurality of spaces, and the electronic components may be respectively accommodated in the divided spaces.

The module cover 300 may be formed of a polymer material. The module cover 300 may be formed of a plastic material. That is, the module cover 300 may be formed of a plastic-based material that can be molded. The module cover 300 may be formed of polycarbonate, but is not limited thereto.

The module cover 300 and the inner plate 200 may be fixed to each other through at least one fixing member. The fixing member may be a screw, but is not limited thereto.

The back cover 400 may be positioned at the rear of the module cover 300. The back cover 400 may cover at least a portion of a rear surface of the module cover 300. The back cover 400 may be positioned to cover the rear accommodation portion of the module cover 300. The back cover 400 may protect the electronic components accommodated in the rear accommodation portion of the module cover 300.

The back cover 400 may be made of a different material from the module cover 300. For example, the back cover 400 may include a metal material. The back cover 400 may be formed through a press process. The back cover 400 and the module cover 300 may be fixed to each other through at least one fixing member. The fixing member may be a screw. Preferably, the fixing member may be a latch. As the back cover 400 and the module cover 300 are fastened using a plurality of latches, they may be free from space constraints with surrounding members or components. Accordingly, a degree of freedom in design can be improved.

A rear surface of the back cover 400 may include a foaming portion 401. The foaming portion 401 may have a shape that is depressed toward the front from the rear surface of the back cover 400. The foaming portion 401 may be a portion into which at least a portion of the wall mount assembly 50 is inserted. By providing the foaming portion 401 capable of accommodating the wall mount assembly 50, the present disclosure can minimize a level of recognition of the wall mount assembly 50 when the wall mount assembly 50 is not used.

The wall mount plate 600 may be positioned between the module cover 300 and the back cover 400. The wall mount plate 600 may be fixed to the module cover 300. The wall mount plate 600 may be fixed to a upper central portion of the module cover 300. The wall mount plate 600 may be positioned to overlap the foaming portion 401.

The wall mount plate 600 may be a portion to which a spacer 610 is fixed. Although not shown, a wall mount bracket for reinforcing rigidity of the wall mount plate 600 may be further provided. However, in order to realize the slimming of the display device, it may be preferable to omit the wall mount bracket.

The spacer 610 may include at least a pair of a first spacer 610a and a second spacer 610b. The first spacer 610a and the second spacer 610b may be positioned at the rear of the back cover 400. The first spacer 610a and the second spacer 610b may be positioned at symmetrical positions with respect to an imaginary axis crossing the center of the wall mount plate 600 in the up-down direction. In other words, the first spacer 610a and the second spacer 610b may be respectively positioned at symmetrical positions with respect to an imaginary axis crossing the center of the display module 10 in the up-down direction.

The first spacer 610a and the second spacer 610b may be fixed to the wall mount plate 600 through a first open hole 403a and a second open hole 403b passing through the back cover 400, respectively. For example, a first nut 601a and a second nut 601b may be fixed to the wall mount plate 600, and a first bolt 610a1 and a second bolt 601b1 may be respectively fixed to the first spacer 610a and the second spacer 610b. The first bolt 610a1 may pass through the first open hole 403a and may be fixed to the first nut 601a, and the second bolt 610b1 may pass through the second open hole 403b and may be fixed to the second nut 601b.

The wall mount assembly 50 may be positioned at the rear of the back cover 400. The wall mount assembly 50 may be movably fastened to at least a pair of the first spacer 610a and the second spacer 610b. A detailed configuration of the wall mount assembly 50 will be described later.

Referring to FIG. 6, a member layer 117 may extend from one side of the display panel 100. For example, the member layer 117 may have a shape extending from the second long side LS2 of the display panel 100. A plurality of member layers 117 may be provided. The member layer 117 may be electrically connected to the display panel 100. The member layer 117 may include at least one of a chip on film (COF), a chip on glass (COG), a flexible printed circuit board (FPCB), and a tape carrier package (TCP).

A source PCB 172 may have a shape extending from the member layer 117. The source PCB 172 may be electrically connected to the member layer 117. A plurality of source PCBs 172 may be provided.

A cable 190 may have a shape extending from the source PCB 172. The cable 190 may be electrically connected to the source PCB 172. A plurality of cables 190 may be provided.

The power or/and signal provided to the cable 190 may be transferred to the source PCB 172. The power or/and signal provided to the source PCB 172 may be distributed to the member layers 117. The power or/and signal distributed to the member layers 117 may be supplied to the display panel 110.

Referring to FIGS. 6 and 7, the member layer 117 may be flexible. The member layer 117 may be bent toward the rear surface of the display panel 100. The member layer 117 may be positioned at the rear of the display panel 100. The source PCB 172 connected to the member layer 117 may be disposed at the rear of the display panel 100. The cable 190 connected to the source PCB 172 may be disposed at the rear of the display panel 100.

The inner plate 200 may include a first slot 201. The first slot 201 may be formed to pass through a thickness of the inner plate 200. The first slot 201 may be formed adjacent to a lower surface of the inner plate 200. The number of first slots 201 may correspond to the number of cables 190, and each cable 190 may pass through the corresponding first slot 201 and extend toward the rear of the inner plate 200. However, the present disclosure is not limited thereto, and, for example, the plurality of cables 190 can pass through one first slot 201.

The module cover 300 may include a second slot 301. The second slot 301 may be formed to pass through a thickness of the module cover 300. The second slot 301 may be formed adjacent to a lower surface of the module cover 300. The number of the second slots 301 may be the same as the number of cables 190, and each cable 190 may pass through the corresponding second slot 301 and extend toward the rear of the module cover 300. However, the present disclosure is not limited thereto, and, for example, the plurality of cables 190 can pass through one second slot 301. The second slot 301 may overlap the first slot 201. The number of second slots 301 may be the same as the number of first slots 201.

As described above, the cable 190 may pass through the first slot 201 and the second slot 301 and may be electrically connected to the electronic component positioned at the rear of the module cover 300. For example, the cable 190 may be electrically connected to the timing controller board 501 to receive the power or/and signal.

FIGS. 8 and 9 are perspective views illustrating a wall mount assembly according to an embodiment of the present disclosure. FIG. 10 illustrates an operation state (a folded state or an unfolded state) of a link portion according to an embodiment of the present disclosure.

Referring to FIGS. 8 to 10, the wall mount assembly 50 according to an embodiment of the present disclosure may include a fixing portion 60, a frame portion 70, and a link portion 80 connecting the fixing portion 60 to the frame portion 70.

The fixing portion 60 may be a portion fixed to the fixture 1000 such as a wall. That is, the fixing portion 60 may be fixed to an arbitrary predetermined position such as a wall surface, and thus its movement may be constrained. The wall mount assembly 50 may be fixed to the attachment surface of the fixture 1000 through a fixing member such as a screw. The fixing portion 60 may have a shape of a plurality of bars extending in one direction, and adjacent bars may be spaced apart from each other by a predetermined distance. However, the present disclosure is not limited thereto.

The frame portion 70 may be a portion fastened to the spacer 610 fixed to the display module 10. The frame portion 70 may be in contact with the rear surface of the display module 10. The frame portion 70 may be provided to have a plate shape with a preset area and may support the display module 10 from the rear. A detailed configuration of the frame portion 70 will be described later.

The link portion 80 includes a first link portion 80a connecting one end of the fixing portion 60 to one end of the frame portion 70, and a second link portion 80b connecting other end of the fixing portion 60 to other end of the frame portion 70.

The first link portion 80a may include a 1-1 link 80a1 and a 1-2 link 80a2.

The 1-1 link 80a1 and the 1-2 link 80a2 may be hinge-coupled. That is, one end of the 1-1 link 80a1 and one end of the 1-2 link 80a2 may be rotatably coupled to each other. For example, the one end of the 1-1 link 80a1 and the one end of the 1-2 link 80a2 may be provided in a shape to mate with each other in the form of male and female and may be coupled to each other. The 1-1 link 80*a*1 and the 1-2 link 80*a*2 may be provided rotatably with respect to each other based on an imaginary axis extending in the up-down direction. In response to the rotation, one surface of the 1-1 link 80*a*1 and one surface of the 1-2 link 80*a*2 may be positioned to contact each other (e.g., in a folded state) or to be spaced apart from each other at a predetermined angle (e.g., in an unfolded state). A friction member may be provided between fixing structures of the one end of the 1-1 link 80*a*1 and the one end of the 1-2 link 80*a*2 to provide a predetermined friction force during rotation. Due to the friction member, the 1-1 link 80*a*1 and the 1-2 link 80*a*2 do not rotate with respect to each other and may maintain an existing state as long as the user does not provide a force greater than or equal to a preset level.

A first accommodation groove 81*a* in which the 1-2 link 80*a*2 can be accommodated may be provided on one surface of the 1-1 link 80*a*1. At least a portion of the 1-2 link 80*a*2 may be accommodated in the first accommodation groove 81*a* of the 1-1 link 80*a*1. Hence, in a state in which the 1-1 link 80*a*1 and the 1-2 link 80*a*2 are folded, an overall thickness of the wall mount assembly 50 can be reduced.

The 1-1 link 80*a*1 may be hinge-connected to one end of the fixing portion 60. That is, other end of the 1-1 link 80*a*1 may be rotatably coupled to the one end of the fixing portion 60. For example, the other end of the 1-1 link 80*a*1 and the one end of the fixing portion 60 may be provided in a shape to mate with each other in the form of male and female and may be coupled to each other. The 1-1 link 80*a*1 may be provided rotatably with respect to the fixing portion 60 based on the imaginary axis extending in the up-down direction. In response to the rotation, the 1-1 link 80*a*1 may be positioned to be parallel to the fixing portion 60 or positioned to have a predetermined angle with respect to the fixing portion 60. A friction member may be provided between fixing structures of the other end of the 1-1 link 80*a*1 and the one end of the fixing portion 60 to provide a predetermined friction force during rotation. Due to the friction member, the 1-1 link 80*a*1 does not rotate with respect to the fixing portion 60 and may maintain an existing state as long as the user does not provide a force greater than or equal to a preset level.

The 1-2 link 80*a*2 may be hinge-connected to one end of the frame portion 70. That is, other end of the 1-2 link 80*a*2 may be rotatably coupled to the one end of the frame portion 70. For example, the other end of the 1-2 link 80*a*2 and the one end of the frame portion 70 may be provided in a shape to mate with each other in the form of male and female and may be coupled to each other. The 1-2 link 80*a*2 may be provided rotatably with respect to the frame portion 70 based on the imaginary axis extending in the up-down direction. In response to the rotation, the 1-2 link 80*a*2 may be positioned to be parallel to the frame portion 70 or positioned to have a predetermined angle with respect to the frame portion 70. A friction member may be provided between fixing structures of the other end of the 1-2 link 80*a*2 and the one end of the frame portion 70 to provide a predetermined friction force during rotation. Due to the friction member, the 1-2 link 80*a*2 does not rotate with respect to the frame portion 70 and may maintain an existing state as long as the user does not provide a force greater than or equal to a preset level.

The second link portion 80*b* may include a 2-1 link 80*b*1 and a 2-2 link 80*b*2.

The 2-1 link 80*b*1 and the 2-2 link 80*b*2 may be hinge-coupled. That is, one end of the 2-1 link 80*b*1 and one end of the 2-2 link 80*b*2 may be rotatably coupled to each other. For example, the one end of the 2-1 link 80*b*1 and the one end of the 2-2 link 80*b*2 may be provided in a shape to mate with each other in the form of male and female and may be coupled to each other. The 2-1 link 80*b*1 and the 2-2 link 80*b*2 may be provided rotatably with respect to each other based on the imaginary axis extending in the up-down direction. In response to the rotation, one surface of the 2-1 link 80*b*1 and one surface of the 2-2 link 80*b*2 may be positioned to contact each other (e.g., in a folded state) or to be spaced apart from each other at a predetermined angle (e.g., in an unfolded state). A friction member may be provided between fixing structures of the one end of the 2-1 link 80*b*1 and the one end of the 2-2 link 80*b*2 to provide a predetermined friction force during rotation. Due to the friction member, the 2-1 link 80*b*1 and the 2-2 link 80*b*2 do not rotate with respect to each other and may maintain an existing state as long as the user does not provide a force greater than or equal to a preset level.

A second accommodation groove 81*b* in which the 2-2 link 80*b*2 can be accommodated may be provided on one surface of the 2-1 link 80*b*1. At least a portion of the 2-2 link 80*b*2 may be accommodated in the second accommodation groove 81*b* of the 2-1 link 80*b*1. Hence, in a state in which the 2-1 link 80*b*1 and the 2-2 link 80*b*2 are folded, an overall thickness of the wall mount assembly 50 can be reduced.

The 2-1 link 80*b*1 may be hinge-connected to other end of the fixing portion 60. That is, other end of the 2-1 link 80*b*1 may be rotatably coupled to one end of the fixing portion 60. For example, the other end of the 2-1 link 80*b*1 and the other end of the fixing portion 60 may be provided in a shape to mate with each other in the form of male and female and may be coupled to each other. The 2-1 link 80*b*1 may be provided rotatably with respect to the fixing portion 60 based on the imaginary axis extending in the up-down direction. In response to the rotation, the 2-1 link 80*b*1 may be positioned to be parallel to the fixing portion 60 or positioned to have a predetermined angle with respect to the fixing portion 60. A friction member may be provided between fixing structures of the other end of the 2-1 link 80*b*1 and the other end of the fixing portion 60 to provide a predetermined friction force during rotation. Due to the friction member, the 2-1 link 80*b*1 does not rotate with respect to the fixing portion 60 and may maintain an existing state as long as the user does not provide a force greater than or equal to a preset level.

The 2-2 link 80*b*2 may be hinge-connected to other end of the frame portion 70. That is, other end of the 2-2 link 80*b*2 may be rotatably coupled to one end of the frame portion 70. For example, the other end of the 2-2 link 80*b*2 and the other end of the frame portion 70 may be provided in a shape to mate with each other in the form of male and female and may be coupled to each other. The 2-2 link 80*b*2 may be provided rotatably with respect to the frame portion 70 based on the imaginary axis extending in the up-down direction. In response to the rotation, the 2-2 link 80*b*2 may be positioned to be parallel to the frame portion 70 or positioned to have a predetermined angle with respect to the frame portion 70. A friction member may be provided between fixing structures of the other end of the 2-2 link 80*b*2 and the other end of the frame portion 70 to provide a predetermined friction force during rotation. Due to the friction member, the 2-2 link 80*b*2 does not rotate with respect to the frame portion 70 and may maintain an existing state as long as the user does not provide a force greater than or equal to a preset level.

As described above, the frame portion 70 fixed to the display module 10 may allow the translational movement and the swivel movement of the display module 10 by the structure of the first link portion 80a and the second link portion 80b.

FIG. 11 illustrates a structure of a frame portion and a relationship between the frame portion and a spacer according to an embodiment of the present disclosure.

Referring to FIG. 11, the display device according to an embodiment of the present disclosure may include spacers 610 and tilting holes 71 that are required to allow the tilting movement of the display module 10.

The display module 10 may include at least a pair of a first spacer 610a and a second spacer 610b. The first spacer 610a and the second spacer 610b may be positioned at the upper center of the display module 10 at the rear of the display module 10. The first spacer 610a and the second spacer 610b may be respectively positioned on both sides to be symmetrical with respect to an imaginary axis crossing the center of the display module 10 in the up-down direction.

The frame portion 70 of the wall mount assembly 50 may include at least a pair of a first tilting hole 71a and a second tilting hole 71b. The first tilting hole 71a may be formed at a position corresponding to the first spacer 610a in the frame portion 70, and the second tilting hole 71b may be formed at a position corresponding to the second spacer 610b in the frame portion 70. The first tilting hole 71a and the second tilting hole 71b may be respectively positioned on both sides to be symmetrical with respect to an imaginary axis crossing the center of the frame portion 70 in the up-down direction.

The first spacer 610a and the second spacer 610b fixed to the display module 10 may be fastened to the first tilting hole 71a and the second tilting hole 71b, respectively. The first tilting hole 71a and the second tilting hole 71b may restrict movement of the first spacer 610a and the second spacer 610b fixed to the display module 10. This means that the movement of the spacers 610 in at least one direction of the display module 10 may be constrained based on the shape of the tilting holes 71. In addition, the first tilting hole 71a and the second tilting hole 71b may guide a movement path of the first spacer 610a and the second spacer 610b fixed to the display module 10. This means that the display module 10 may be tilted or shifted in a preset direction based on the shape of the tilting hole 71.

FIG. 12 illustrates a shape of a spacer according to an embodiment of the present disclosure. FIGS. 13 to 15 illustrate a structure of a spacer and a tilting hole according to an embodiment of the present disclosure.

Referring to FIG. 12, the spacer 610 includes a spacer head 611 and a spacer neck 613. The spacer head 611 and the spacer neck 613 may have different cross-sectional areas on the plane. For example, the spacer head 611 and the spacer neck 613 may have cylindrical shape s having different diameters. That is, the spacer head 611 may have a cylindrical shape with a first diameter FRD, and the spacer neck 613 may have a cylindrical shape that extends from the spacer head 611 and has a second diameter SRD less than the first diameter FRD. Since the spacer 610 includes the spacer head 611 and the spacer neck 613 having the different diameters, the spacer 610 may be easily fastened to at least one side of the tilting hole 71 to be described later.

Referring to FIGS. 13 to 15, the frame portion 70 may include the tilting holes 71. The tilting hole 71 includes an inlet portion IP and a guide portion TP. The guide portion TP may be positioned lower than the inlet portion IP. The guide portion TP may be positioned lower than the inlet portion IP along a load direction (or gravity direction).

The inlet portion IP may be a portion that the spacer 610 is drawn in and out of. That is, the inlet portion IP may have a sufficient hole area to the extent that both the spacer head 611 and the spacer neck 613 can be drawn in and out it. In other words, the inlet portion IP may have a hole area greater than the first diameter FRD of the spacer head 611. In other words, in the inlet portion IP, the forward and backward movements of the spacer head 611 and the spacer neck 613 are not constrained. The inlet portion IP is illustrated to have a substantially circular shape, but is not limited thereto. For example, the inlet portion IP may have various planar shapes such as a rectangle, a square, and an oval.

The guide portion TP may include a seating portion TP1 and first and second extensions TP2 and TP3 extending from the seating portion TP1 in one direction. The first extension TP2 and the second extension TP3 may extend in a reverse direction based on the seating portion TP1. An extension line EL traveling in the extension direction of the first and second extensions TP2 and TP3 and a horizontal line HL traveling in a horizontal direction intersect each other, and an angle θ between the lines is a tilting angle or a dutch angle. The tilting angle means an inclined angle not a vertical or horizontal angle. An acute angle between the extension line EL and the horizontal line HL may be preferably 5°<θ<30°.

The guide portion TP may be a portion to which the spacer 610 is fixed in the tilting hole 71. For example, the seating portion TP1 may be a portion where the spacer 610 moving along the shape of the tilting hole 71 in response to the movement of the display module 10 is first seated in the guide portion TP.

When a predetermined external force is provided, the display module 10 may be tilted in one direction, and the spacer 610 may move along the shape of the guide portion TP in response to the tilting. The movement direction of the spacer 610 may be guided along the shape of the guide portion TP.

The guide portion TP has a hole area to the extent that the spacer head 611 cannot be drawn in and out of it. That is, the guide portion TP may have a hole area less than the first diameter FRD of the spacer head 611. Hence, the forward movement of the spacer head 611 introduced toward the rear of the frame portion 70 through the inlet portion IP is constrained in the guide portion TP. Accordingly, the spacer 610 is not separated from the guide portion TP. The guide portion TP has a hole area to the extent that the spacer neck 613 can pass through it. That is, the guide portion TP may have a hole area greater than the second diameter SRD of the spacer neck 613.

The tilting hole 71 may further include a movement portion LP connecting the inlet portion IP and the guide portion TP. The movement portion LP may function as a movement path of the spacer 610 moving between the inlet portion IP and the guide portion TP. For example, the movement portion LP may be a movement path where the spacer 610 introduced through the inlet portion IP moves to the guide portion TP so that the spacer 610 can be seated in the tilting hole 71. On the contrary, the movement portion LP may be a movement path where the spacer 610 seated on the guide portion TP moves to the inlet portion IP so that the spacer 610 can be separated from the tilting hole 71. Since the tilting hole 71 includes the movement portion LP, a sufficient movement path of the spacer 610 can be secured. Hence, the present disclosure can prevent the spacer 610 seated on the guide portion TP from moving to the inlet portion IP by an external force that is unintentionally provided and from being separated from the tilting hole 71.

The movement portion LP has a hole area to the extent that the spacer head 611 cannot be drawn in and out of it. That is, the movement portion LP may have a hole area less than the first diameter FRD of the spacer head 611. Hence, the forward movement of the spacer head 611 introduced toward the rear of the frame portion 70 through the inlet portion IP is constrained in the movement portion LP. Accordingly, the spacer 610 is not separated from the movement portion LP. The movement portion LP has a hole area to the extent that the spacer neck 613 can pass through it. That is, the guide portion TP may have a hole area greater than the second diameter SRD of the spacer neck 613. The hole area of the movement portion LP may be different from the hole area of the guide portion TP.

FIGS. 16 to 18 illustrate a position relationship and a shape of a pair of spacers according to the present disclosure.

Referring to FIG. 16, the display module 10 includes at least a pair of the first spacer 610a and the second spacer 610b. The frame portion 70 of the wall mount assembly 50 includes at least a pair of the first tilting hole 71a and the second tilting hole 71b.

The first spacer 610a may be provided at a position corresponding to the first tilting hole 71a and may be movably drawn in the first tilting hole 71a. The second spacer 610b may be provided at a position corresponding to the second tilting hole 71b and may be movably drawn into the second tilting hole 71b.

The display module 10 fastened to the frame portion 70 of the wall mount assembly 50 may be tilted in a preset direction. However, before a predetermined external force is applied, the display module 10 may maintain a current state (or a fixed state) in which the display module 10 is fastened to the wall mount assembly 50. The preset direction may be determined based on positions and shapes of the first tilting hole 71a and the second tilting hole 71b. In particular, the preset direction may be determined based on positions and shapes of a guide portion TP (hereinafter referred to as a "first guide portion TPa") of the first tilting hole 71a and a guide portion TP (hereinafter referred to as a "second guide portion TPb") of the second tilting hole 71b.

The first guide portion TPa and the second guide portion TPb may be positioned on a line of an imaginary arc ARC. The imaginary arc ARC may mean an imaginary curve connecting a center of the first guide portion TPa and a center of the second guide portion TPb. The imaginary arc ARC may have a shape convexly curved downwardly ((a) of FIG. 16) or convexly curved upwardly ((b) of FIG. 16).

For example, the center of the first guide portion TPa and the center of the second guide portion TPb may be respectively positioned on the line of the imaginary arc ARC in areas corresponding to the left and right sides of the frame portion 70. The imaginary arc ARC may be an arc that is a part of a circumference of a circle with an imaginary center point. The imaginary center point may be positioned on a reference line RL crossing the center of the frame portion 70 in the up-down direction. The curvature of the arc ARC may vary depending on a position of the center point on the reference line RL.

The center of the first guide portion TPa on the line of the arc ARC may correspond to the center of the first spacer 610a fixed to the display module 10. In particular, the center of the first guide portion TPa on the line of the arc ARC may correspond to a center of a spacer neck 613 of the first spacer 610a. When the first spacer 610a has a cylindrical shape, the center of the first spacer 610a may be the center of a circle.

The center of the second guide portion TPb on the line of the arc ARC may correspond to the center of the second spacer 610b fixed to the display module 10. In particular, the center of the second guide portion TPb on the line of the arc ARC may correspond to a center of a spacer neck 613 of the second spacer 610b. When the second spacer 610b has a cylindrical shape, the center of the second spacer 610b may be the center of a circle.

Referring to (a) of FIG. 17, an extension direction of the first guide portion TPa may be a direction in which a tangent line TL of the arc ARC passing through the centers of the first and second guide portions TPa and TPb travels. An extending direction of the second guide portion TPb forming a pair with the first guide portion TPa may be a direction in which the tangent line TL of the arc ARC passing through the centers of the first and second guide portions TPa and TPb travels.

Referring to (b) of FIG. 17, an extension direction of the first guide portion TPa may be a direction in which the arc ARC passing through the centers of the first and second guide portions TPa and TPb travels. An extending direction of the second guide portion TPb forming a pair with the first guide portion TPa may be a direction in which the arc ARC passing through the centers of the first and second guide portions TPa and TPb travels. In this case, the first guide portion TPa and the second guide portion TPb may have a curved shape.

Referring to FIG. 18, the first tilting hole 71a and the second tilting hole 71b may have a symmetrical shape. For example, the first tilting hole 71a and the second tilting hole 71b may be respectively positioned in areas corresponding to one side and other side of the frame portion 70 so that they are line-symmetrical to each other with respect to an imaginary reference line RL.

The imaginary reference line RL may be an imaginary straight line crossing the center of the frame portion 70 in the up-down direction. For example, a first angle $\theta 1$ formed by a first extension line EL1 travelling in the extension direction of the first guide portion TPa and a horizontal line HL travelling in the horizontal direction may be the same as a second angle $\theta 2$ formed by a second extension line EL1 travelling in the extension direction of the second guide portion TPb and the horizontal line HL travelling in the horizontal direction.

FIGS. 19 to 21 illustrate a locking portion according to an embodiment of the present disclosure.

Referring to FIGS. 19 to 21, the frame portion 70 according to an embodiment of the present disclosure may include a locking portion 90. The locking portion 90 is fastened to the frame portion 70 and may function to selectively restrict the movement path of the spacer 610 inserted into the tilting hole 71. That is, the locking portion 90 may function to selectively open and close the movement path of the spacer 610 inserted into the tilting hole 71 according to the user's needs.

The locking portion 90 may be rotatably provided for the frame portion 70 by being hinge-coupled to the frame portion 70. The locking portion 90 may be positioned at the rear of the frame portion 70. At least a part of the locking portion 90 may be positioned to overlap the tilting hole 71.

More specifically, at least a part of the locking portion 90 may be positioned to correspond to an area between the inlet portion IP and the guide portion TP of the tilting hole 71 and may selectively restrict a movement path of the spacer 610 moving between the inlet portion IP and the guide portion TP. For example, at least a part of the locking portion 90 may be positioned to correspond to the movement portion LP of the tilting hole 71 and may selectively restrict a movement path of the spacer 610 that moves to the inlet portion IP from the guide portion TP, but is not limited thereto. At least a part of the locking portion 90 that blocks the movement path of the spacer 610 described above may be referred to as a blocking portion 91.

The locking portion 90 may have an elongated rod shape to have an approximately U-shape. The locking portion 90 may have an open loop shape in which a portion is opened. The locking portion 90 may include at least one bent portion or bending portion, but is not limited thereto.

One end and other end of the locking portion 90 may be rotatably coupled to the frame portion 70. For example, the frame portion 70 may include a first through hole 75a and a second through hole 75b that penetrate in the up-down direction. One end of the locking portion 90 may be rotatably coupled to the first through hole 75a with respect to an imaginary axis extending in the up-down direction, and other end of the locking portion 90 may be rotatably coupled to the second through hole 75b with respect to an imaginary axis extending in the up-down direction. A through hole 75 may be formed in a protrusion 72 protruding rearward from the frame portion 70.

In a mode (or locking mode) of closing the movement path of the spacer 610, at least a part of the locking portion 90 may be extended to cross the inlet portion IP and may block the spacer 110 inserted into the guide portion TP from moving to the inlet portion IP. In the locking mode, the spacer 610 inserted into the guide portion TP can be prevented from unintentionally moving to the inlet portion IP and being withdrawn from the tilting hole 71.

In a mode (or unlocking mode) of opening the movement path of the spacer 610, at least a part of the locking portion 90 is spaced apart from the frame portion 70 toward the rear and may not block the spacer 610 inserted into the guide portion TP from moving to the inlet portion IP. That is, in the unlocking mode, since the movement path of the spacer 610 is not limited by the locking portion 90, the spacer 610 inserted into the guide portion TP may move to the inlet portion IP and may be drawn from the tilting hole 71.

The frame portion 70 may further include a stopper 73 for limiting the movement of the locking portion 90 in the locking mode. The stopper 73 may have a shape that protrudes rearward from the frame portion 70. The stopper 73 may be positioned around the tilting hole 71. The stopper 73 may be positioned around the inlet portion IP. The stopper 73 may extend from the periphery of the inlet portion IP along the shape of the inlet portion IP, but is not limited thereto.

A lower surface 73a of the stopper 73 may be positioned so as to be in contact with the blocking portion 91. That is, in the locking mode, the blocking portion 91 of the locking portion 90 may contact the lower surface 73a of the stopper 73, and its upward movement may be restricted by the stopper 73. Accordingly, the movement of the spacer 610 can be more effectively restricted by the stopper 73. That is, as the stopper 73 is further provided, it is possible to effectively block the movement of the spacer 610 in the locking mode.

For example, in the locking mode, at least a part of the locking portion 90 may be positioned to surround an outer perimeter of the stopper 73.

The lower surface 73a of the stopper 73 may further include a trench 74. The trench 74 may have a shape in which a portion is recessed upward from the lower surface 73a of the stopper 73. The lower surface 73a of the stopper 73 provided with the trench 74 may have an inclined shape ((a) of FIG. 20) or a rounded shape ((a) of FIG. 20), but is not limited thereto.

The blocking portion 91 of the locking portion 90 may be positioned to overlap one end of the stopper 73 corresponding to the lower surface 73a of the stopper 73. Thus, in the locking mode, at least a part of the blocking portion 91 of the locking portion 90 may be accommodated in an inner space of the trench 74, and its rearward movement may be restricted. That is, in the locking mode, the blocking portion 91 of the locking portion 90 may maintain a state accommodated in the inner space of the trench 74 unless an external force greater than or equal to a predetermined value is provided. Hence, in the locking mode, there is an advantage of preventing the unwanted separation of the locking portion 90. On the contrary, in the unlocking mode, the user may separate the blocking portion 91 of the locking portion 90 from the trench 74 by providing a predetermined force to the locking portion 90. In such a structure, since the user can recognize whether the locking portion 90 is seated in the trench 74 or separated from the trench 74 by a click sound or a fingertip sense, there is an advantage of easily knowing whether the locking is performed.

FIGS. 22 and 23 illustrate an auxiliary locking portion according to an embodiment of the present disclosure.

Referring to FIGS. 22 and 23, the wall mount assembly according to an embodiment of the present disclosure may further include an auxiliary locking portion 95. The auxiliary locking portion 95 may be fixed to the fixing portion 60 and may function to selectively restrict the movement of the frame portion 70. The auxiliary locking portion 95 may be an elastic member with a predetermined elasticity. For example, the auxiliary locking portion 95 may be a leaf spring, but is not limited thereto.

One end of the auxiliary locking portion 95 may be fixed to the fixing portion 60. Other end of the auxiliary locking portion 95 may extend downward from the one end of the auxiliary locking portion 95 and may be positioned to overlap at least a part of the frame portion 70 in the front-rear direction.

In a state where the display module 10 is in a position close to the fixture 1000, the other end of the auxiliary locking portion 95 may be positioned in front of the frame portion 70 and may restrict a movement toward the front of the frame portion 70. The state where the display module 10 is in the position close to the fixture 1000 may refer to a state where one surface of the 1-1 link 80a1 and one surface of the 1-2 link 80a2 constituting the first link portion 80a contact each other, and a state where one surface of the 2-1 link 80b1 and one surface of the 2-2 link 80b2 constituting the second link portion 80b contact each other. Alternatively, the state where the display module 10 is in the position close to the fixture 1000 may refer to a state where the translation movement and the swivel movement of the display module 10 are restricted.

On the contrary, in a state where the display module 10 is in a position spaced apart from the fixture 1000, the other end of the auxiliary locking portion 95 may be positioned at the rear of the frame portion 70 and may not restrict a movement toward the front of the frame portion 70. The state where the display module 10 is in the position spaced apart from the fixture 1000 may refer to a state where one surface of the 1-1 link 80a1 and one surface of the 1-2 link 80a2 constituting the first link portion 80a are separated from each other by a predetermined angle, and a state where one surface of the 2-1 link 80b1 and one surface of the 2-2 link 80b2 constituting the second link portion 80b are separated from each other by a predetermined angle. Alternatively, the state where the display module 10 is in the position spaced apart from the fixture 1000 may refer to a state where the translation movement and the swivel movement of the display module 10 are allowed.

FIGS. 24 to 27 illustrate an auxiliary locking portion according to another embodiment of the present disclosure.

Referring to FIGS. 24 to 26, the wall mount assembly 50 according to an embodiment of the present disclosure may further include an auxiliary locking portion 700. The auxiliary locking portion 700 may be fixed to the fixing portion 60 and may function to selectively restrict the movement of the frame portion 70.

The auxiliary locking portion 700 may include at least one magnet 710. At least a part of the magnet 710 may be exposed toward the frame portion 70. Hence, at least a part of the magnet 710 and the frame portion 70 may be attached to each other by a magnetic force in a state where the display module 10 is in a position close to the fixture 1000. For example, in a state where the display module 10 is in a position close to the fixture 1000, the rear surface of the frame portion 70 and the magnet 710 may contact each other and maintain a contact state unless a predetermined external force is provided. As described above, an embodiment of the present disclosure further includes the auxiliary locking portion 700 including the magnet 710, and thus can more effectively control the movement of the wall mount assembly 50. Hence, the unwanted movement of the display module 10 can be prevented.

To this end, the frame portion 70 may be made of a material that sticks by a magnetic force of the magnet 710, for example, a metal material. However, the present disclosure is not limited thereto. For example, the frame portion 70 may further include a member formed of a material that sticks to each other by the magnetic force of the magnet 710, and the member may be fixed to the frame portion 70 at a position opposite to the magnet 710. In this case, the materials of the frame portion 70 and the member may be different.

Herein, the state where the display module 10 is in the position close to the fixture 1000 may refer to a state where one surface of the 1-1 link 80a1 and one surface of the 1-2 link 80a2 constituting the first link portion 80a contact each other, and a state where one surface of the 2-1 link 80b1 and one surface of the 2-2 link 80b2 constituting the second link portion 80b contact each other. Alternatively, the state where the display module 10 is in the position close to the fixture 1000 may refer to a state where the translation movement and the swivel movement of the display module 10 are restricted.

The auxiliary locking portion 700 may include a case for fixing the magnet 710 to the fixing portion 60. The case may include a front body 720, a middle body 730, and a rear body 740.

The front body 720 may be fixed to the fixing portion 60.

For example, the fixing portion 60 may include a first bar 61 and a second bar 62 extending in a first direction (e.g., left-right direction), and the first bar 61 and the second bar 62 may be disposed to be spaced apart from each other by a predetermined distance in a second direction (e.g., up-down direction). The first bar 61 may be positioned at an upper side, and the second bar 62 may be positioned at a lower side.

The front body 720 may be divided and include a first front body 721 and a second front body 722. The first front body 721 and the second front body 722 may be spaced apart from each other by a predetermined distance in the second direction. The first front body 721 may be fixed to the first bar 61 and may extend toward the second bar 62. The second front body 722 may be fixed to the second bar 62 and may extend toward the first bar 61. The first front body 721 and the second front body 722 may be integrally formed with the first bar 61 and the second bar 62, respectively.

The first front body 721 may include a first recess 723 passing through a thickness. The second front body 722 may include a second recess 724 passing through a thickness. The first recess 723 and the second recess 724 may open toward each other. The first recess 723 and the second recess 724 may open toward each other to form one front hole 725. As will be described later, an accommodation protrusion 731 may be inserted into the front hole 725 provided by the first recess 723 and the second recess 724.

The middle body 730 may be fixed to the rear of the front body 720. As illustrated, the middle body 730 may be fixed to a rear surface of the front body 720 through a screw 733, but is not limited thereto. The middle body 730 may be made of a plastic-based material that can be molded into a mold, such as polycarbonate, but is not limited thereto.

The middle body 730 may include the accommodation protrusion 731 protruding toward the front body 720. The accommodation protrusion 731 may have a protrusion hole 732 provided by passing through an inside of the accommodation protrusion 731. As illustrated, the accommodation protrusion 731 may have a cylindrical shape through which the inside is penetrated, but is not limited thereto. The accommodation protrusion 731 may be provided to be insertable into the front hole 725 provided by the first recess 723 and the second recess 724.

The magnet 710 may be inserted into the protrusion hole 732 of the accommodation protrusion 731. An external shape of the magnet 710 and a shape of the accommodation protrusion 731 may be the same, but are not limited thereto. An outer surface of the magnet 710 and an inner surface of the accommodation protrusion 731 may contact each other, but are not limited thereto. The accommodation protrusion 731 may restrict and/or constrain the movement of the magnet 710 inserted therein in the first direction or the second direction.

The middle body 730 may further include at least one first alignment protrusion 737. The first alignment protrusion 737 may protrude in the same direction as the accommodation protrusion 731. The first alignment protrusion 737 may be inserted between the first front body 721 and the second front body 722 that are spaced apart from each other in the up-down direction. The first alignment protrusion 737 may be inserted between the first front body 721 and the second front body 722 at the outside of the front hole 725 when the accommodation protrusion 731 is inserted into the front hole 725. As the first alignment protrusion 737 is provided, it is possible to restrict misalignment between the middle body 730 and the front body 720 when fixing the middle body 730 and the front body 720. Therefore, the middle body 730 and the front body 720 can be easily aligned, and assembly easiness can be improved.

The middle body 730 may further include at least one second alignment protrusion 736. The second alignment protrusion 736 may protrude in the same direction as the accommodation protrusion 731. In this case, the front body 720 may be provided with an accommodation hole 726 into which the accommodation protrusion 731 is inserted. The second alignment protrusion 736 may be inserted into the accommodation hole 726 when the accommodation protrusion 731 is inserted into the front hole 725. As the second alignment protrusion 736 is provided, it is possible to restrict misalignment between the middle body 730 and the front body 720 when fixing the middle body 730 and the front body 720. Therefore, the middle body 730 and the front body 720 can be easily aligned, and assembly easiness can be improved.

The rear body 740 may be fixed to the rear of the middle body 730. The rear body 740 and the middle body 730 may be fixed through an adhesive member 750 interposed therebetween, but are not limited thereto. The adhesive member 750 may be a double-sided tape.

The adhesive member 750 may fix the rear body 740 to the middle body 730 and also fix the magnet 710 accommodated in the accommodation protrusion 731 to the middle body 730. That is, in a preferred embodiment, the rear body 740, the middle body 730, and the magnet 710 may be mutually fixed using one adhesive member 750. To this end, the adhesive member 750 may be positioned to correspond to the protrusion hole 732 of the accommodation protrusion 731. The rear body 740 and the adhesive member 750 restrict the front and rear movement of the magnet 710 and thus can prevent the magnet 710 from being separated.

The rear body 740 may be formed of a non-magnetic material such as a rubber. The rear body 740 may be formed to have a material and/or a thickness capable of restricting and/or blocking the magnetic force of the magnet 710. Hence, it is possible to prevent a problem in which structures other than the frame 70 (e.g., a steel structure positioned on the fixture 1000 such as a wall, etc.) are unnecessarily attached to the magnet 710.

The frame portion 70 may further include an auxiliary foaming portion 77 protruding toward the magnet 710 of the auxiliary locking portion 700. The auxiliary foaming portion 77 may facilitate the contact with the magnet 710.

More specifically, the auxiliary foaming portion 77 may be formed such that at least a part of the auxiliary foaming portion 77 is inserted into the accommodation protrusion 731 of the front body 720 in a state where the display module 10 is in a position close to the fixture 1000. That is, at least a part of the auxiliary foaming portion 77 may be inserted into the protrusion hole 732 of the protrusion used in the state where the display module 10 is in the position close to the fixture 1000. In this case, even if the magnet 710 is completely accommodated in the protrusion hole 732 and is not exposed to the outside of the accommodation protrusion 731, the auxiliary foaming portion 77 can easily contact the magnet 710. Therefore, the auxiliary locking portion 700 can easily perform its function.

Referring to FIG. 27, the accommodation protrusion 731 may further include at least one auxiliary stopper 738 extending from an inner peripheral surface of the accommodation protrusion 731 toward the inside of the protrusion hole 732 (e.g., the center of the protrusion hole 732). The auxiliary stopper 738 may be positioned in front of the magnet 710 to restrict the forward movement of the magnet 710. Hence, there is an advantage of preventing the unwanted separation of the magnet 710.

The frame portion 70 may further include at least one foaming hole 78 formed depending on the position of the auxiliary stopper 738. The foaming hole 78 may be formed in the auxiliary foaming portion 77. The foaming hole 78 may be provided so that the auxiliary stopper 738 can be inserted in the state where the display module 10 is in the position close to the fixture 1000. The number of foaming holes 78 may correspond to the number of auxiliary stoppers 738. A portion excluding the foaming hole 78 from the auxiliary foaming portion 77 may be inserted into the protrusion hole 732 and may contact the magnet 710 in the state where the display module 10 is in the position close to the fixture 1000.

Various modifications and changes can be made by those skilled in the art without departing from the technical spirit of the present disclosure through the above description. Accordingly, the technical scope of the present disclosure should not be limited to the detailed description of the present disclosure, but should be defined by the claims.

The invention claimed is:

1. A display device comprising:
 a display module including a display panel;
 at least a pair of first and second spacers positioned at a rear of the display module and fixed to the display module; and
 a wall mount assembly positioned at a rear of a back cover and fastened to the first and second spacers, the wall mount assembly configured to allow a movement of the first and second spacers,
 wherein the wall mount assembly includes:
 a fixing portion fixed to a fixture;
 a frame portion including a pair of first and second tilting holes into which the first and second spacers are respectively inserted, and configured to guide a movement path of the first and second spacers;
 a link portion configured to connect the fixing portion to the frame portion; and
 an auxiliary locking portion fixed to the fixing portion, the auxiliary locking portion including at least one magnet attached to at least a part of the frame portion by a magnetic force,
 wherein the auxiliary locking portion includes:
 a front body fixed to the fixing portion;
 a middle body positioned at a rear of the front body and fixed to the front body; and
 a rear body fixed to a rear of the middle body,
 wherein the front body includes a front hole passing through a thickness,
 wherein the middle body includes an accommodation protrusion that protrudes to be inserted into the front hole and includes a protrusion hole accommodating the magnet, and
 wherein the rear body is formed of a non-magnetic material.

2. The display device of claim 1, wherein the fixing portion includes first and second bars that extend along a first direction and are spaced apart from each other by a predetermined distance in a second direction intersecting the first direction,
 wherein the front body includes:
 a first front body fixed to the first bar and extending toward the second bar; and
 a second front body fixed to the second bar, extending toward the first bar, and spaced apart from the first front body by a predetermined distance in the second direction,
 wherein the first front body includes a first recess passing through a thickness,
 wherein the second front body includes a second recess passing through a thickness, and
 wherein the front hole is formed by opening the first recess and the second recess toward each other.

3. The display device of claim 2, wherein the middle body includes at least one first alignment protrusion protruding toward the front body, and
 wherein the first alignment protrusion is inserted between the first front body and the second front body at an outside of the front hole.

4. The display device of claim 2, wherein the middle body includes at least one second alignment protrusion protruding toward the front body, and
  wherein the front body includes an accommodation hole into which the second alignment protrusion is inserted.

5. The display device of claim 1, wherein the frame portion includes an auxiliary foaming portion that protrudes toward the auxiliary locking portion and is insertable into the protrusion hole,
  wherein the accommodation protrusion includes at least one auxiliary stopper that extends from an inner peripheral surface of the accommodation protrusion toward an inside of the protrusion hole and is positioned at a front of the magnet,
  wherein the frame portion includes a foaming hole into which the auxiliary stopper is inserted, and
  wherein the foaming hole is formed in the auxiliary foaming portion.

6. The display device of claim 1, wherein the wall mount assembly includes a locking portion configured to selectively restrict the movement path of the first and second spacers inserted into the first and second tilting holes.

7. The display device of claim 6, wherein each of the first and second tilting holes includes:
  an inlet portion configured to enable to insert and withdraw the spacer;
  a guide portion positioned at a lower side of the inlet portion, the spacer inserted through the inlet portion being seated on the guide portion; and
  a movement portion configured to connect the inlet portion to the guide portion,
  wherein the locking portion includes a blocking portion that is rotatably fastened to the frame portion and is correspondingly positioned between the inlet portion and the guide portion, and
  wherein the blocking portion is positioned based on the movement portion.

8. The display device of claim 6, wherein each of one end and other end of the locking portion is rotatably fastened to the frame portion.

9. The display device of claim 7, wherein each of the first and second spacers includes:
  a spacer head having a first diameter; and
  a spacer neck extending from the spacer head and having a second diameter less than the first diameter,
  wherein the inlet portion has a hole area greater than the first diameter, and
  wherein the guide portion has a hole area that is less than the first diameter and is greater than the second diameter.

10. The display device of claim 9, wherein the guide portion includes:
  a seating portion; and
  first and second extensions extending from the seating portion in one direction,
  wherein each of the first and second extensions extends in a reverse direction from the seating portion.

11. The display device of claim 10, wherein an extension line traveling in an extension direction of the guide portion and a horizontal line traveling in a horizontal direction of the guide portion intersect each other, and
  wherein an angle formed by the extension line and the horizontal line is a tilting angle.

12. The display device of claim 10, wherein each of the guide portions of the first and second tilting holes extends in a straight line form along a tangential direction of an imaginary arc passing centers of the guide portions of the first and second tilting holes, or extends in a curved form along an extension direction of the imaginary arc.

13. The display device of claim 12, wherein the imaginary arc is convexly curved upwardly or convexly curved downwardly.

14. The display device of claim 12, wherein the imaginary arc is an arc that is a part of a circumference of a circle with an imaginary center point, and
  wherein the imaginary center point is positioned on a reference line crossing a center of the frame portion in an up-down direction.

15. The display device of claim 6, wherein the first and second tilting holes are symmetrical with respect to a reference line crossing a center of the frame portion in an up-down direction.

16. The display device of claim 1, wherein the display module includes:
  a module cover positioned at a rear of the display panel;
  a back cover positioned at a rear of the module cover, the back cover including first and second open holes positioned corresponding to the first and second spacers; and
  a wall mount plate positioned between the module cover and the back cover and fixed to the module cover,
  wherein the first and second spacers are respectively fixed to the wall mount plate through the first and second open holes at a rear of the back cover.

17. The display device of claim 16, wherein the back cover includes a foaming portion overlapping the wall mount plate, and
  wherein at least a part of the wall mount assembly is inserted into the foaming portion.

18. The display device of claim 1, wherein the link portion includes first and second links that are rotatably coupled to each other based on an imaginary first axis extending in an up-down direction,
  wherein one end of the first link is rotatably coupled to the fixing portion based on an imaginary second axis extending in the up-down direction, and
  wherein one end of the second link is rotatably coupled to the frame portion based on an imaginary third axis extending in the up-down direction.

19. The display device of claim 18, wherein the first link includes an accommodation groove in which at least a part of the second link is accommodated.

* * * * *